(12) United States Patent
Li et al.

(10) Patent No.: US 11,171,709 B1
(45) Date of Patent: Nov. 9, 2021

(54) MILLIMETER WAVE BASE STATION ANTENNA SYSTEM

(71) Applicant: Hsueh-Jyh Li, New Taipei (TW)

(72) Inventors: Hsueh-Jyh Li, New Taipei (TW); Chi-Min Lee, Keelung (TW); Pao-Jen Wang, New Taipei (TW)

(73) Assignee: Hsueh-Jyh Li, New Taipei (TW)

( * ) Notice: Subject to any disclaimer, the term of this patent is extended or adjusted under 35 U.S.C. 154(b) by 0 days.

(21) Appl. No.: 16/889,349

(22) Filed: Jun. 1, 2020

(51) Int. Cl.
| | |
|---|---|
| *H04B 7/08* | (2006.01) |
| *H04B 7/0426* | (2017.01) |
| *H04B 17/336* | (2015.01) |
| *H04B 1/12* | (2006.01) |
| *H04B 1/04* | (2006.01) |
| *H04L 5/14* | (2006.01) |
| *H04B 1/30* | (2006.01) |
| *H04B 1/00* | (2006.01) |

(52) U.S. Cl.
CPC ......... *H04B 7/0857* (2013.01); *H04B 1/0028* (2013.01); *H04B 1/0475* (2013.01); *H04B 1/126* (2013.01); *H04B 1/30* (2013.01); *H04B 7/043* (2013.01); *H04B 17/336* (2015.01); *H04L 5/14* (2013.01); *H04B 2001/307* (2013.01)

(58) Field of Classification Search
CPC .... H04B 1/0028; H04B 1/0475; H04B 1/126; H04B 1/30; H04B 7/02; H04B 7/04; H04B 7/0404; H04B 7/0408; H04B 7/0413; H04B 7/043; H04B 7/0456; H04B 7/0617; H04B 7/0842; H04B 7/0857; H04B 7/2043; H04B 17/336; H04B 2001/0408; H04B 2001/0416; H04B 2007/307; H04L 5/14; H04L 5/1423; H04L 5/22; H04L 27/18; H04L 27/2628; H04L 27/263; H04L 27/265
USPC ......... 375/259–262, 265, 267; 370/208, 210, 370/335, 337, 342, 347
See application file for complete search history.

(56) References Cited

U.S. PATENT DOCUMENTS

| | | | |
|---|---|---|---|
| 10,714,836 B1* | 7/2020 | Karabacak | H01Q 15/04 |
| 2012/0320818 A1* | 12/2012 | Yang | H04B 7/15542 370/315 |
| 2014/0044044 A1* | 2/2014 | Josiam | H04B 7/063 370/328 |
| 2014/0177607 A1* | 6/2014 | Li | H04W 52/42 370/336 |
| 2016/0006122 A1* | 1/2016 | Seol | H04B 7/0408 342/372 |
| 2020/0136663 A1* | 4/2020 | Shanan | H04B 1/0057 |

* cited by examiner

*Primary Examiner* — Young T. Tse
(74) *Attorney, Agent, or Firm* — Sinorica, LLC

(57) ABSTRACT

A millimeter wave base station antenna system having a multi-port antenna array and a baseband signal processor, the baseband signal processor having an uplink baseband processing unit for generating a first weighting function, and a downlink baseband processing unit for generating a second weighting function; the first weighting function and the second weighting function being used to enhance the desired signal and eliminate the multiuser interference.

11 Claims, 15 Drawing Sheets

MILLIMETER WAVE BASE STATION ANTENNA SYSTEM

BACKGROUND OF THE INVENTION

Field of the Invention

The present invention relates to millimeter wave communication, and more particularly to a millimeter wave base station antenna system using a multi-port antenna array and a baseband signal processor.

Description of the Related Art

Due to the massive growth of wireless data in mobile broadband communication, millimeter-wave (mm-wave) communication is put forward as the most attractive solution for 5G mobile communication. Because the mm-wave communication operates in a frequency range from 30 GHz to 300 GHz, it can offer high data rates for broadband wireless communication. In realizing the mm-wave communication, multiple antenna architecture is a preferred choice because it is capable of increasing the channel capacity, and among different multiple antenna architectures, the directional steerable antenna architecture is known to be especially good at improving the received signal-to-interference-to-noise ratio (SINR).

Nowadays, mm-wave base station antenna system is commonly equipped with a transceiver architecture of phased-array antenna, frequency diverse array (FDA) or massive hybrid antenna array. The phased-array antenna architecture includes a plurality of antenna elements, each of the antenna elements being electrically connected to a T/R (transmitter/receiver) module that includes a T/R switch, a low-noise amplifier (LNA), a power amplifier (PA), and a phase shifter. The phased-array antennas have been evidenced to exhibit high directivity because they can steer the beam electronically. However, the phased-array antenna architecture is found to have some limitations and/or shortcomings in practical use. First of all, the phase shifters lead the phased-array antenna architecture to have a high manufacturing cost. Besides, the phase shifters also introduce additional insertion loss. Secondly, when a new user-end wireless device appears, the phased array antennas are configured to search and track the newly-appearing user-end wireless device, eventually causing a part of computing resources of the mm-wave base station antenna system be occupied. Thirdly, the mm-wave base station antenna system using the phased-array antenna architecture fails to support multi user-end wireless devices at different directions to share the wireless bandwidth through OFDMA (Orthogonal Frequency Division Multiple Access).

It is also known that massive MIMO (multiple input multiple output) antenna array is used to build the frequency diverse array architecture. The massive MIMO antenna array architecture includes a plurality of antenna elements, and each antenna element is electrically connected to a T/R (transmitter/receiver) module that merely includes a T/R switch, a low-noise amplifier (LNA), and a power amplifier (PA). In addition, the antenna element is also electrically connected to a mixer, an analog-to-digital (A/D) converter, and a digital-to-analog (D/A) converter. However, the conventional frequency diverse array architecture mentioned above has a very high establishing cost. Moreover, a considerable amount of transmission data causes the mm-wave base station antenna system using the frequency diverse array architecture has a huge computation loading, especially in case of the signal bandwidth being increased to several hundreds of MHz.

As for the massive hybrid antenna array architecture, it is known that the massive hybrid antenna array architecture includes a plurality of antenna elements divided into multi subarrays, where each of the multi subarrays has a common port electrically connected to a mixer, an A/D converter and a D/A converter. Moreover, in the multi subarrays, each antenna element is electrically connected to a T/R module including a phase shifter, an LNA, and a PA. As such, beam forming of each of the subarrays can be controlled by the corresponding phase shifters that are respectively connected to the antenna elements. It is worth noting that, the number of the mixers, the A/D converters and the D/A converters used in the massive hybrid antenna array architecture is significantly less than that of the above-introduced massive MIMO antenna array architecture. However, the massive hybrid antenna array architecture is still found to show some drawbacks in practical use. First, the mm-wave base station antenna system having the massive hybrid antenna array architecture is configured to search and track the user-end wireless devices by calculating amplitude weightings and phase-shifting weightings of the subarrays, thereby eventually causing the mm-wave base station antenna system spend a considerable computing resources to complete the calculation of the amplitude and phase-shifting weightings. Secondly, during an operation of OFDMA, it is difficult for the mm-wave base station antenna system using the massive hybrid antenna array architecture to facilitate multi user-end wireless devices at different directions to use the same wireless bandwidth by modulating the phase shifters in the subarrays.

From the above descriptions, it is clear that there is still room for improvement in the mm-wave base station antenna system equipped with a conventional transceiver architecture of phased-array antenna, massive MIMO antenna array or massive hybrid antenna array. In view of that, a novel millimeter wave base station antenna system using a multi-port antenna array module and a baseband signal processor is needed.

SUMMARY OF THE INVENTION

The main objective of the present invention is to disclose a millimeter wave base station antenna system having a multi-port antenna array and a baseband signal processor. The baseband signal processor is provided with an uplink baseband processing unit therein for generating a first weighting function, and is simultaneously provided with a downlink baseband processing unit therein for generating a second weighting function. Therefore, the first weighting function and the second weighting function are executed to enhance the desired signal and eliminate the multiuser interference.

To attain the foregoing objective, an embodiment of the millimeter wave base station antenna system is proposed, including:

an antenna array, including a plurality of antenna elements divided into M subarrays, each of the M subarrays having a port, and M being a positive integer greater than 1;

a front-end analog processing circuit, including M transmitter/receiver units coupled respectively to the ports of the M subarrays, M analog baseband processing units coupled respectively to the M transmitter/receiver units, and M analog-to-digital and digital-to-analog conversion units coupled respectively to the M analog baseband processing units; and a baseband processing circuit, including M serial-to-parallel and parallel-to-serial conversion units coupled respectively to the M analog-to-digital and digital-to-analog conversion units and a baseband processor coupled to the M serial-to-parallel and parallel-to-serial conversion units;

where after a first RF signal is transmitted by a wireless electronic device and then received by the antenna array, the first RF signal is converted to a first digital in-phase signal and a first digital quadrature signal by the front-end analog processing circuit, and Q first subcarriers are generated according to the first digital in-phase signal and the first digital quadrature signal by at least one of the M serial-to-parallel and parallel-to-serial conversion units of the baseband processing circuit, Q being a positive integer greater than 1; and where the baseband processor receives the Q first subcarriers in parallel, has an uplink baseband processing unit for generating a first weighting function according to the Q first subcarriers, and has a downlink baseband processing unit for generating a second weighting function according to Q second subcarriers, thereby utilizing the first weighting function and the second weighting function to enhance the desired signal and eliminate the multiuser interference.

In one embodiment, each of the M subarrays is driven to radiate a steered beam of millimeter wave with a beam pattern and a beam direction, and the M subarrays being disposed on a surface that is a planar surface or a curved surface with a specific radius.

In one embodiment, the antenna subarray is an aperture antenna, and each two beam patterns of two neighboring aperture antennas overlap each other.

In one embodiment, the transmitter/receiver unit includes:

a switch having a first terminal, a second terminal and a third terminal, the first terminal being coupled to the antenna subarray;

a low noise amplifier coupled to the second terminal of the switch;

a frequency down-converter coupled between the low noise amplifier and the analog baseband processing unit and receiving an in-phase signal and a quadrature signal that are generated by a local oscillator;

a power amplifier coupled to the third terminal of the switch; and a frequency up-converter coupled between the power amplifier and the analog baseband processing unit and receiving the in-phase signal and the quadrature signal.

In one embodiment, the analog baseband processing unit includes:

a transimpedance amplifier coupled to the frequency down-converter of the transmitter/receiver unit;

a first low-pass filter coupled to the transimpedance amplifier;

a first variable gain amplifier coupled between the first low-pass filter and the analog-to-digital and digital-to-analog conversion unit;

a first buffer coupled to the analog-to-digital and digital-to-analog conversion unit;

a second low-pass filter coupled to the first buffer; and a second variable gain amplifier coupled between the second low-pass filter and the frequency up-converter of the transmitter/receiver unit.

In one embodiment, the analog-to-digital and digital-to-analog conversion unit includes:

a second buffer coupled to the first variable gain amplifier of the analog baseband processing unit;

an analog-to-digital converter coupled between the second buffer and the serial-to-parallel and parallel-to-serial conversion unit of the baseband processing circuit; and a digital-to-analog converter coupled between the serial-to-parallel and parallel-to-serial conversion unit and the first buffer of the analog baseband processing unit.

In one embodiment, when the switch is switched to make the first terminal electrically connected to the second terminal, the low noise amplifier, the frequency down-converter, the transimpedance amplifier, the first low-pass filter, the first variable gain amplifier, the second buffer, the analog-to-digital converter, and the serial-to-parallel and parallel-to-serial conversion unit are utilized in the downlink path to process the first RF signal received by the subarray with a signal amplifying operation, a frequency down conversion, a current-to-voltage conversion, a noise filtering operation, a gain modulating operation, and an analog-to-digital conversion respectively, thereby generating the first digital in-phase signal and the first digital quadrature signal.

In one embodiment, when the switch is switched to make the first terminal electrically connected to the third terminal, the serial-to-parallel and parallel-to-serial conversion unit, the digital-to-analog converter, the first buffer, the second low-pass filter, the second variable gain amplifier, the frequency up-converter, and the power amplifier are utilized in the uplink path to process a second digital in-phase signal and a second digital quadrature signal transmitted from the serial-to-parallel and parallel-to-serial conversion unit with a digital-to-analog conversion, a noise filtering operation, a gain modulating operation, a frequency up conversion, and a power amplifying operation respectively, thereby radiating a second RF signal through one said antenna element in the subarray.

In one embodiment, the serial-to-parallel and parallel-to-serial conversion unit includes:

a cyclic prefix removing unit coupled to the analog-to-digital converter of the analog-to-digital and digital-to-analog conversion unit for performing a cyclic prefix removing operation on the first digital in-phase signal and the first digital quadrature signal to generate a first prefix removed in-phase signal and a first prefix removed quadrature signal;

a serial-to-parallel converter coupled to the cyclic prefix removing unit for performing a serial-to-parallel conversion on the first prefix removed in-phase signal and the first prefix removed quadrature signal to generate Q input signals;

a fast Fourier transform unit coupled to the serial-to-parallel converter for performing a fast Fourier transform operation on the Q input signals to generate Q first subcarriers;

an inverse fast Fourier transform unit coupled to the baseband processor for receiving Q second subcarriers and performing an inverse fast Fourier transform operation on the Q second subcarriers to generate Q output signals;

a parallel-to-serial converter coupled to the inverse fast Fourier transform unit for performing a parallel-to-serial conversion on the Q output signals to generate the second digital in-phase signal and the second digital quadrature signal; and a cyclic prefix inserting unit coupled to the parallel-to-serial converter for performing a cyclic prefix inserting operation on the second digital in-phase signal and the second digital quadrature signal to generate a second cyclic prefix inserted in-phase signal and a second cyclic prefix inserted quadrature signal and transmitting the second cyclic prefix inserted in-phase signal and the second cyclic prefix inserted quadrature signal to the digital-to-analog converter of the analog-to-digital and digital-to-analog conversion unit.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

The invention as well as a preferred mode of use and advantages thereof will be best understood by referring to the following detailed description of an illustrative embodiment in conjunction with the accompanying drawings, where.

DETAILED DESCRIPTION OF THE PREFERRED EMBODIMENTS

To more clearly describe a millimeter wave base station antenna system using a multi-port antenna array and a baseband signal processor proposed by the present invention, embodiments of the present invention will be described in detail with reference to the attached drawings hereinafter.

Figure 1:
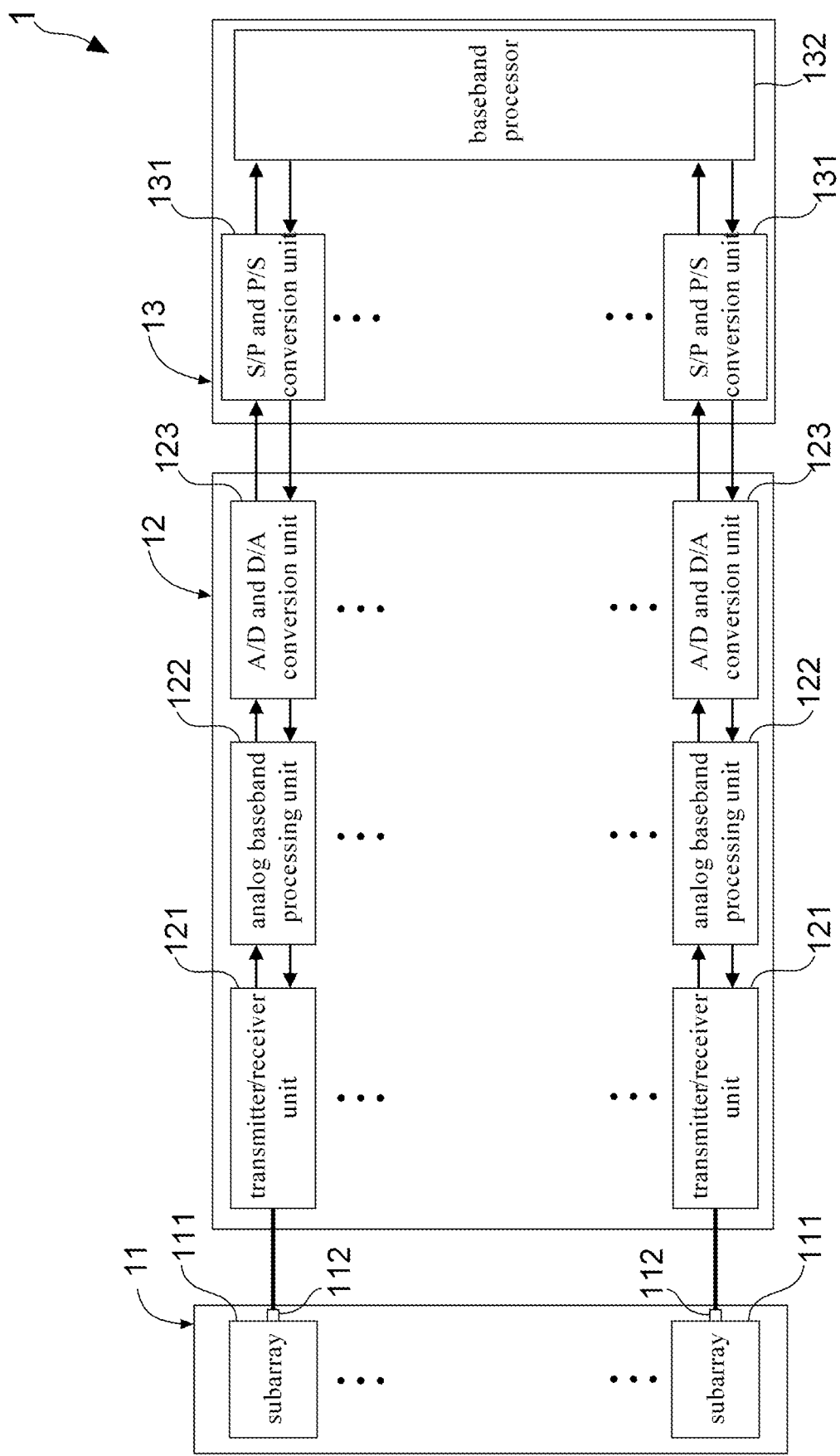
FIG. 1 shows a block diagram of a millimeter wave base station antenna system according to the present invention.
Figure 2A:
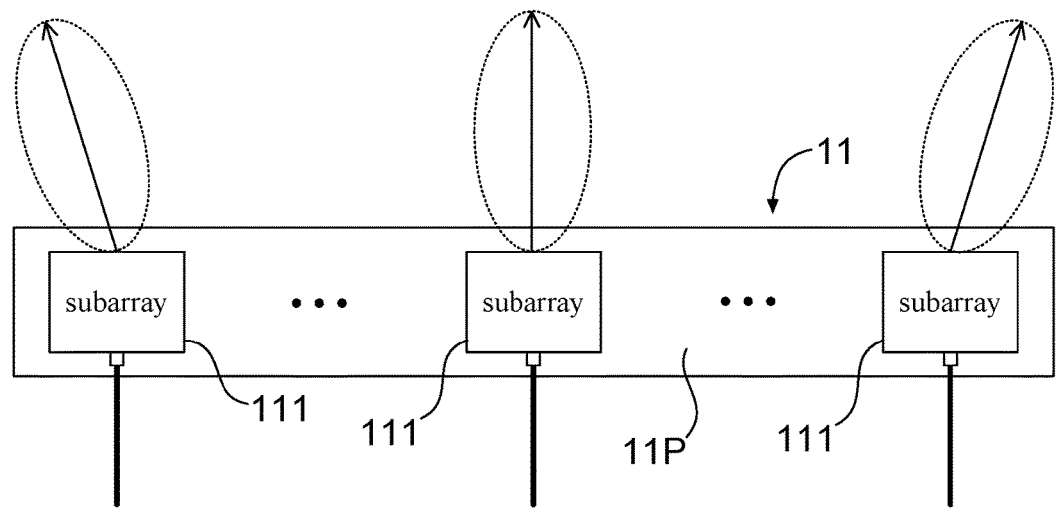
FIG. 2A shows a first framework view of an antenna array in the millimeter wave base station antenna system according to the present invention.
Figure 2B:
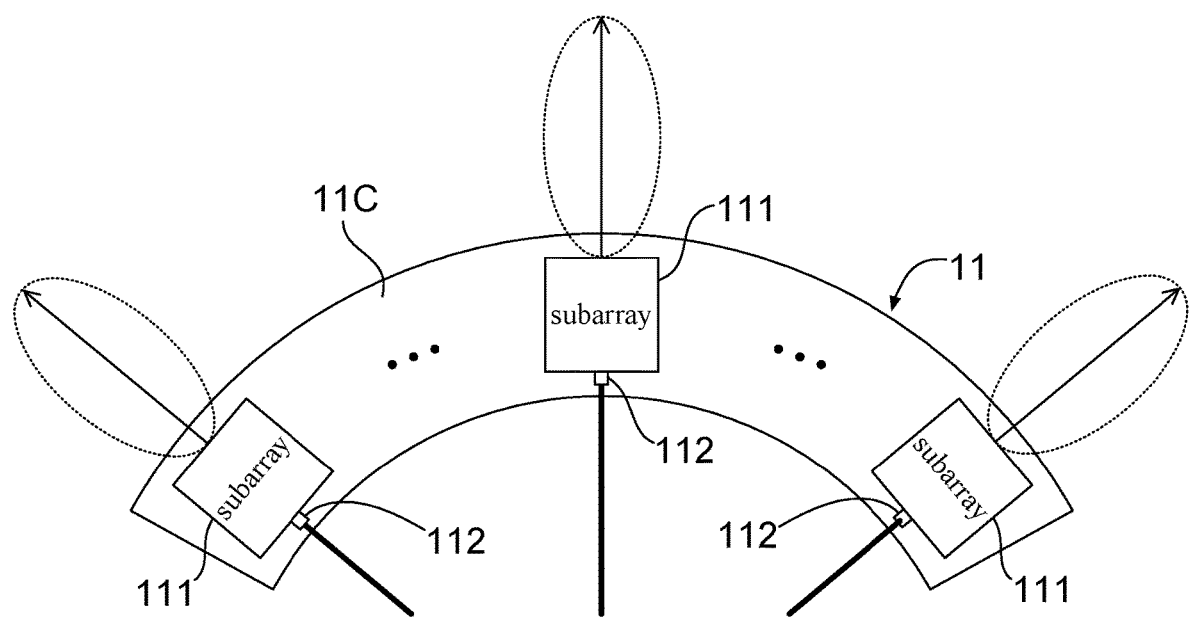
FIG. 2B shows a second framework view of the antenna array in the millimeter wave base station antenna system according to the present invention.

Please refer to FIG. 1, which illustrates a block diagram of a millimeter wave base station antenna system according to the present invention. As FIG. 1 shows, the millimeter wave base station antenna system 1 mainly includes an antenna array 11, a front-end analog processing circuit 12 and a baseband processing circuit 13. FIG. 2A illustrates a first framework view of the antenna array. In one practicable embodiment, the antenna array 11 includes a plurality of antenna elements that are divided into M subarrays 111. Moreover, FIG. 2A further depicts that the M subarrays 111 are disposed on a planar surface 11P, and each of the M subarrays 111 has a port 112, where M is an positive integer. Besides, FIG. 2B illustrates a second framework view of the antenna array. In another practicable embodiment, the M subarrays 111 can also be disposed on a curved surface 11C with a specific radius, and one kind of aperture antenna like a horn antenna is adopted for implementing the antenna element. By such arrangement, each of the M subarrays 111 is capable of being driven to radiate a steered beam of millimeter wave with a beam pattern and a beam direction, and each two neighboring ones of the M beam patterns partially or highly overlap each other.

Figure 3:
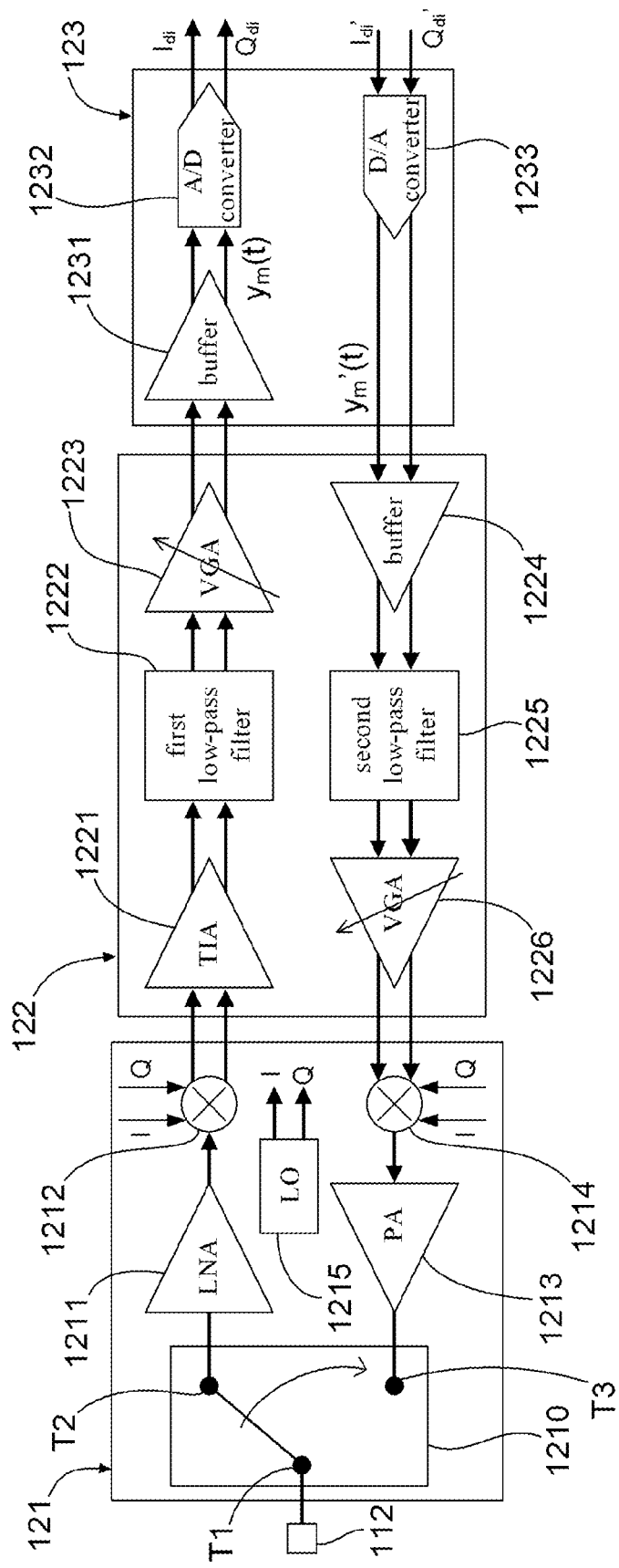
FIG. 3 shows a block diagram of a front-end analog processing circuit in the millimeter wave base station antenna system according to the present invention.

Referring to FIG. 1 again, and please simultaneously refer to FIG. 3, which shows a block diagram of the front-end analog processing circuit 12. According to the present invention, the front-end analog processing circuit 12 includes M transmitter/receiver (T/R) units 121 coupled respectively to the M ports 112, M analog baseband processing units 122 respectively coupled to the M T/R units 121, and M analog-to-digital (A/D) and digital-to-analog (D/A) conversion units 123 coupled respectively to the M analog baseband processing units 122.

The T/R unit 121 includes a switch 1210, a low noise amplifier (LNA) 1211, a frequency down-converter 1212, a power amplifier (PA) 1213, and a frequency up-converter 1214.

The switch 1210 has a first terminal T1 coupled to the subarray port 112, a second terminal T2 and a third terminal T3; the LNA 1211 is coupled to the second terminal T2 of the switch 1210; the frequency down-converter 1212 is coupled between the LNA 1211 and the analog baseband processing unit 122, and is also coupled to an in-phase signal I and a quadrature signal Q that are generated by a local oscillator (LO) 1215; the PA 1213 is coupled to the third terminal T3 of the switch 1210; and the frequency up-converter 1214 is coupled between the power amplifier 1213 and the analog baseband processing unit 122, and the frequency up-converter 1214 is simultaneously coupled to the in-phase signal I and the quadrature signal Q.

The analog baseband processing unit 122 includes a transimpedance amplifier (TIA) 1221, a first low-pass filter (LPF) 1222, a first variable gain amplifier (VGA) 1223, a first buffer 1224, a second low-pass filter (LPF) 1225, and a second variable gain amplifier (VGA) 1226.

The TIA 1221 is coupled to the frequency down-converter 1212 of the transmitter/receiver unit 121; the first LPF 1222 is coupled to the transimpedance amplifier 1221; the first VGA 1223 is coupled between the first LPF 1222 and the A/D and D/A conversion unit 123; the first buffer 1224 is coupled to the A/D and D/A conversion unit 123; the second LPF 1225 is coupled to the first buffer 1224; and the second VGA 1226 is coupled between the second low-pass filter 1225 and the frequency up-converter 1214 of the T/R unit 121.

The A/D and D/A conversion unit 123 is configured to include a second buffer 1231, an analog-to-digital (A/D) converter 1232, and a digital-to-analog (D/A) converter 1233.

The second buffer 1231 is coupled to the first variable gain amplifier 1223 of the analog baseband processing unit 122; the A/D converter 1232 is coupled between the second buffer 1231 and the S/P and P/S conversion unit 131 of the baseband processing circuit; and the D/A converter 1233 is coupled between the S/P and P/S conversion unit 131 and the first buffer 1224 of the analog baseband processing unit 122.

Figure 4:
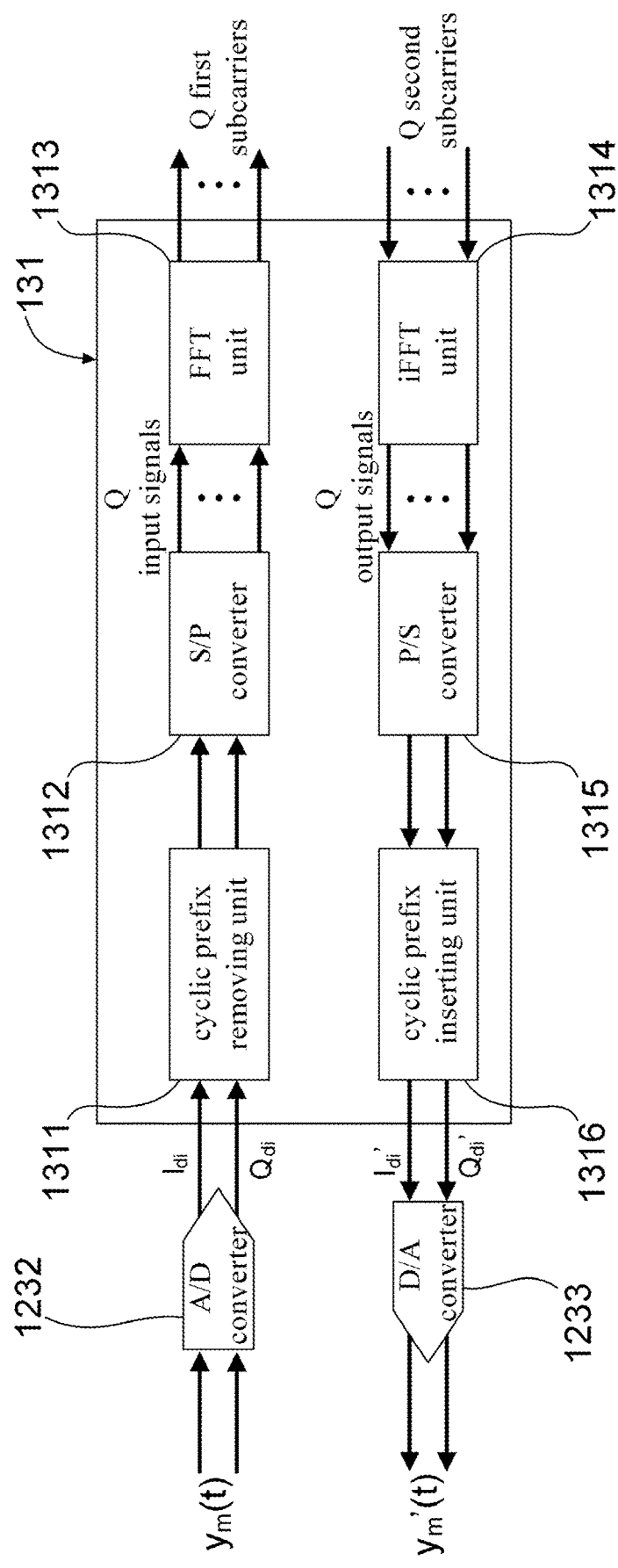
FIG. 4 shows a block diagram of an S/P and P/S conversion unit in the millimeter wave base station antenna system according to the present invention.

Referring to FIG. 1 and FIG. 3 again, and please simultaneously refer to FIG. 4, which shows a block diagram of the S/P and P/S conversion unit 131. According to the present invention, the S/P and P/S conversion unit 131 is configured to include a cyclic prefix removing unit 1311, a serial-to-parallel (S/P) converter 1312, a fast Fourier transform (FFT) unit 1313, an inverse fast Fourier transform (iFFT) unit 1314, a parallel-to-serial (P/S) converter 1315, and a cyclic prefix inserting unit 1316.

The cyclic prefix removing unit 1311 is coupled to the A/D converter 1232 of the A/D and D/A conversion unit 123 for receiving the first digital in-phase signal Idi and the first digital quadrature signal Qdi, so as to apply a cyclic prefix removing process to the first digital in-phase signal Idi and the first digital quadrature signal Qdi; the S/P converter 1312 is coupled to the cyclic prefix removing unit 1311 to apply a serial-to-parallel conversion to the output signals of the cyclic prefix removing unit 1311, thereby producing Q input signals; the FFT unit 1313 is coupled to the S/P converter 1312 for receiving the Q input signals in parallel to apply a fast Fourier transform (FFT) process to the Q input signals, thereby producing Q first subcarriers that are eventually received by the baseband processor 132; the iFFT unit 1314 is coupled to the baseband processor 132 for receiving Q second subcarriers to perform an inverse fast Fourier transform (iFFT) operation on the Q second subcarriers, thereby producing Q output signals; the P/S converter 1315 coupled to the iFFT unit 1314 receives the Q output signals to apply a parallel-to-serial conversion to the Q output signals, thereby producing a second digital in-phase signal and a second digital quadrature signal; and the cyclic prefix inserting unit 1316 coupled to the P/S converter 1315 receives the second digital in-phase signal and the second digital quadrature signal to apply a cyclic prefix inserting process to the second digital in-phase signal and the second digital quadrature signal, thereby generating and transmitting a second cyclic prefix inserted in-phase signal Idi' and a second cyclic prefix inserted quadrature signal Qdi' to the D/A converter 1233 of the A/D and D/A conversion unit 123.

During the operation, when the switch 1210 is switched to make the first terminal T1 electrically connected to the second terminal T2, the LNA 1211, the frequency down-converter 1212, the TIA 1221, the first LPF 1222, the first VGA 1223, the second buffer 1231, the A/D converter 1232, and the S/P and P/S conversion unit 131 will be utilized to form a downlink path, such that the first RF signal received by the subarray 111 is applied with a signal amplifying process, a frequency down conversion, a current-to-voltage conversion, a noise filtering process, a gain modulating process, and an analog-to-digital conversion by the LNA 1211, the frequency down-converter 1212, the TIA 1221, the first LPF 1222, the first VGA 1223, and the A/D converter 1232 respectively, and thereby converted to the first digital in-phase signal Idi and the first digital quadrature signal Qdi that are eventually received by the S/P and P/S conversion unit 131.

In addition, when the switch 1210 is switched to make the first terminal T1 electrically connected to the third terminal T3, the S/P and P/S conversion unit 131, the D/A converter 1233, the first buffer 1224, the a second LPF 1225, the second VGA 1226, the frequency up-converter 1214, and the PA 1213 will be utilized to form an uplink path, such that the second digital in-phase signal Idi' and the second digital quadrature signal Qdi' transmitted from the S/P and P/S conversion unit 131 are applied with a digital-to-analog conversion, a noise filtering process, a gain modulating process, a frequency up conversion, and a power amplifying process by the D/A converter 1233, the second LPF 1225, the second VGA 1226, the frequency up-converter 1214, and the PA 1213 respectively, thereby radiating a second RF signal through a corresponding antenna element in the subarray 111.

It is worth noting that, as FIG. 1, FIG. 3 and FIG. 4 show, the baseband processor 132 receives the Q first subcarriers in parallel. According to the present invention, the baseband processor 132 is provided with an uplink baseband processing unit therein for generating a first weighting function based on the Q first subcarriers, and provided with a downlink baseband processing unit therein for generating a second weighting function based on Q second subcarriers, thereby utilizing the first weighting function and the second weighting function to enhance the desired signal and eliminate the multiuser interference.

First Weighting Function for Use in Single User Case

Figure 5A:
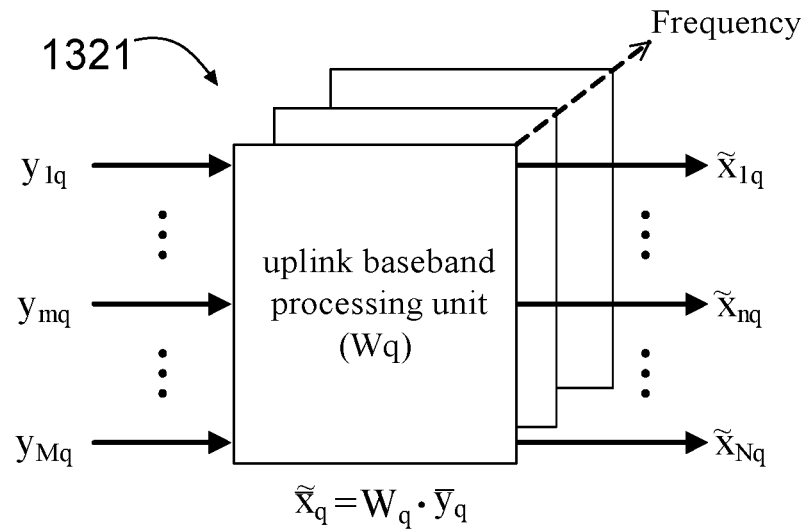
FIG. 5A shows a diagram for describing an execution of an uplink baseband processing unit in the millimeter wave base station antenna system according to the present invention.

FIG. 5A illustrates a diagram for describing an execution of the uplink baseband processing unit 1321 of the baseband processor 132. The uplink baseband processing unit 1321 is configured for generating a first weighting function for making an estimated signal vector given by $\tilde{X}_q = W_q \cdot \bar{y}_q$ is as close as to $\bar{x}_q$ for each subcarrier q. Above descriptions have introduced that after an RF signal is transmitted by N user equipments (UEs) and then received by m-th of the M subarrays 111 of the antenna array 11, the RF signal is subsequently applied with a signal amplifying process, a frequency down conversion, a current-to-voltage conversion, a noise filtering process, a gain modulating process, and an analog-to-digital conversion by the front-end analog processing circuit 12, and is consequently converted to a first digital in-phase signal Idi and a first digital quadrature signal Qdi. Next, the first digital in-phase signal Idi and the first digital quadrature signal Qdi are further converted to Q subcarriers by the S/P and P/S conversion unit 131 of the baseband processing circuit 13.

Second Weighting Function for Use in Downlink

Figure 5B:
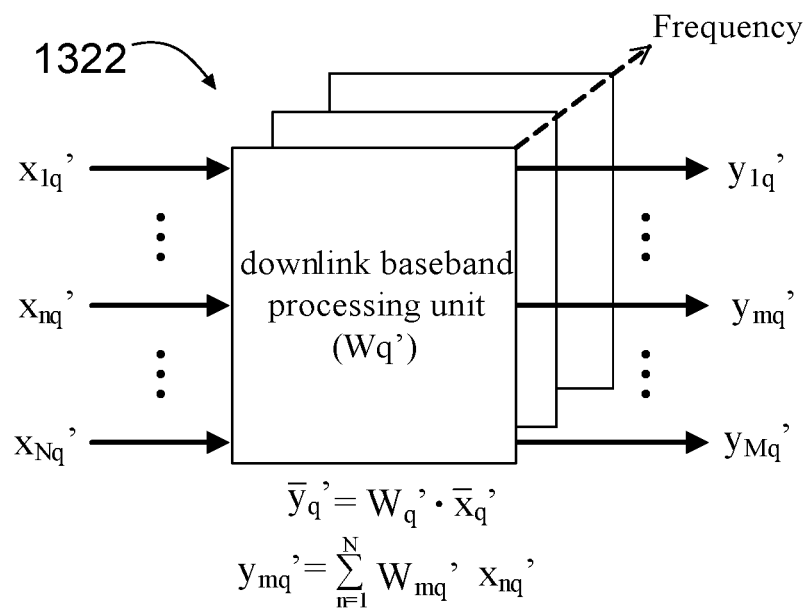
FIG. 5B shows a diagram for describing an execution of the downlink baseband processing unit in the millimeter wave base station antenna system for the multi-user case.

FIG. 5B illustrates a diagram for describing an execution of the downlink baseband processing unit 1322 of the baseband processor 132 that is operated in a TDD mode. The downlink baseband processing unit 1322 is configured for generating a second weighting function for making an estimated signal vector given by $\hat{y}_q'=W_q'\cdot\bar{x}_q'$. In FIG. 5B, $(x_{1q}', \ldots, x_{nq}', \ldots, x_{Nq}')$ are the source signals to be transmitted to the N user equipments (UEs), and $(y_{1q}', \ldots, y_{mq}', \ldots, y_{Mq}')$ are M output signals to be transmitted by the M subarrays 111. In which, each output signal consists of the source signals $(x_{1q}', \ldots, x_{nq}', \ldots, x_{Nq}')$. The above descriptions have introduced that after the switch 1210 is switched to make the first terminal T1 be electrically connected to the third terminal T3, the S/P and P/S conversion unit 131, the D/A converter 1233, the first buffer 1224, the a second LPF 1225, the second VGA 1226, the frequency up-converter 1214, and the PA 1213 achieve a signal transmission through an uplink path, such that the second digital in-phase signal Idi' and the said second digital quadrature signal Qdi' transmitted from the S/P and P/S conversion unit 131 are applied with a digital-to-analog conversion, a noise filtering process, a gain modulating process, a frequency up conversion, and a power amplifying process by the D/A converter 1233, the second LPF 1225, the second VGA 1226, the frequency up-converter 1214, and the PA 1213 respectively, thereby radiating a second RF signal through the corresponding antenna element in the subarray 111.

Because there are N user equipments (UEs) may receive the second RF signal, the signal vector $\bar{x}_q'$ is therefore given by $\bar{x}_q'=(x_{1q}', \ldots, x_{Nq}')^T$, where q means q-th of the Q second subcarriers. Furthermore, signal vectors received by the N UEs $\bar{z}_q'$ is given $\bar{z}_q' \sim \bar{x}_q'$. That is, $\bar{z}_q'^T=(z_{1q}', \ldots, z_{Nq}') \sim (x_{1q}', \ldots, x_{Nq}') \sim \bar{x}_q'^T$.

Figure 5C:
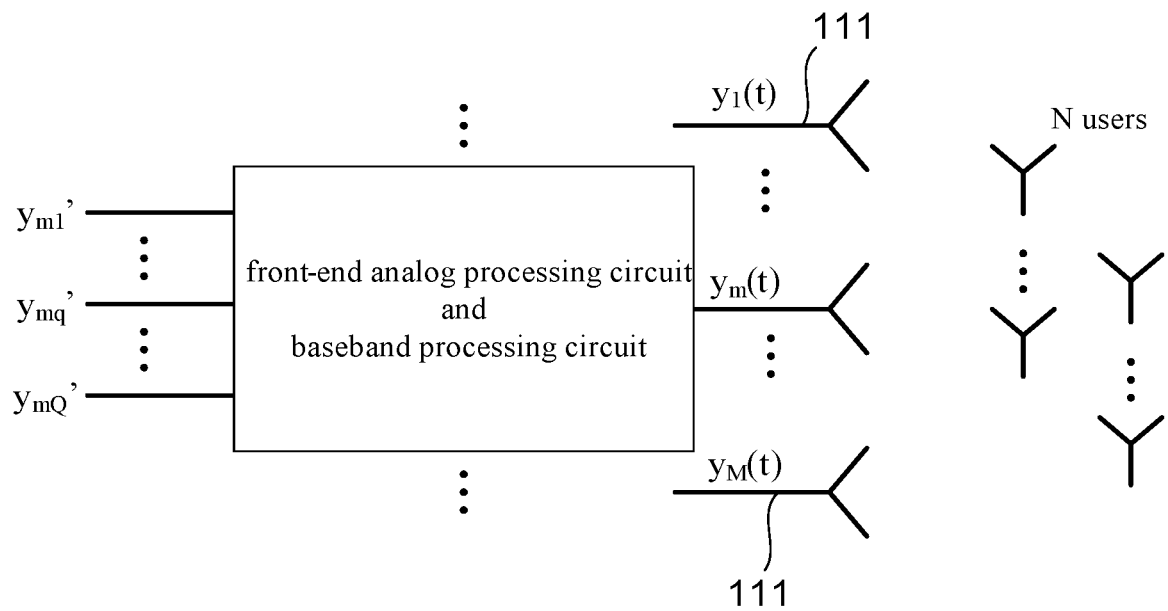
FIG. 5C shows a diagram for describing an execution of a downlink wireless communication of the millimeter wave base station antenna system for the multi-user case.
Figure 5D:
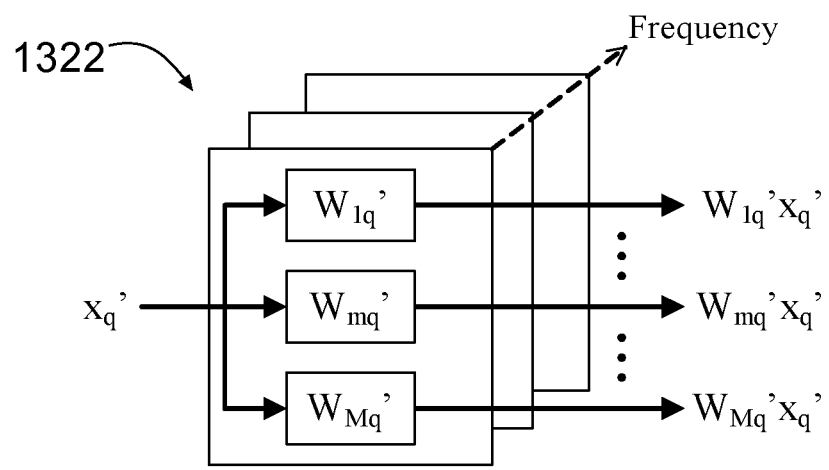
FIG. 5D shows a diagram for describing an execution of the downlink baseband processing unit in the millimeter wave base station antenna system for the single user case.
Figure 5E:
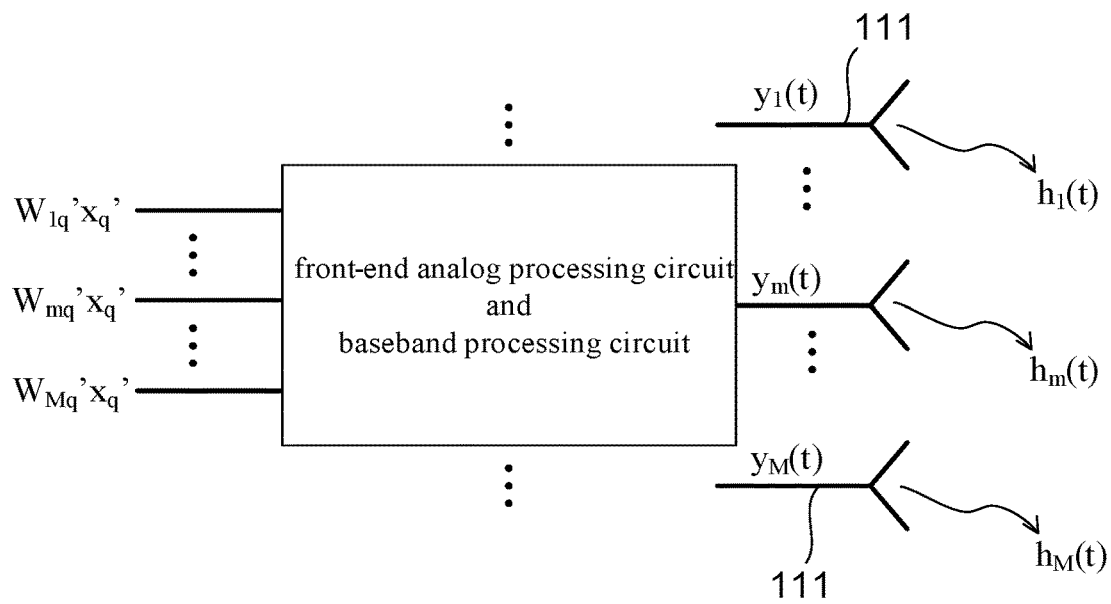
FIG. 5E shows a diagram for describing an execution of a downlink wireless communication of the millimeter wave base station antenna system for the single user case.

The above procedure is depicted in FIG. 5C. For the single user case, $\bar{x}_q'$(vector) becomes $x_q'$ (scalar), and the weighting matrix $W_q'$ becomes $\overline{W}_q'$ (vector) and is given by $\overline{W}_q'^T=(W_{1q}', W_{2q}', \ldots W_{Mq}')$, and $y_{mq}'=W_{mq}'x_q'$ as shown in FIG. 5D. After the same procedure of FIG. 5C, the RF signal $y_m(t)$ is transmitted through the $m^{th}$ subarray 111 to the user as depicted in FIG. 5E.

Maximum Ratio Coding (MRC)

In case of the foregoing signal is a known pilot signal $x_{pq}$, a digital signal $y_{mpq}$ that is transmitted from the first VGA 1223 of the analog baseband processing unit 122 to the A/D and D/A conversion unit 123 is given by $y_{mpq}=H_{mq}\cdot x_{pq}$, where $H_{mq}$ is a channel response, m and q indicating the m-th of the M subarrays 111 and q-th of the Q subcarriers, respectively. It is noted that $y_{mpq}$ can be measured or estimated, $x_{pq}$ is a known quantity, therefore, $H_{mq}$ can be obtained by dividing $y_{mpq}$ with $x_{pq}$. As such, when an unknown signal $x_q$ is received by the m-th of the M subarrays 111, the foregoing digital signal $y_{mpq}$ is given by $y_{mq}=H_{mq}\cdot x_q$. Therefore, after letting each of M digital signals $y_{mpq}$ that are respectively transmitted by the M first VGAs 1223 be multiplied by the foregoing first weighting function, the M digital signals $y_{mq}$ are summed to a total signal $y_{Tq}$ as given by the following mathematical equation (1).

$$y_{Tq} = \sum_{m=1}^{M} W_{mq} \cdot y_{mq} \qquad (1)$$

As such, the mathematical equation (1) is further derived to become the following mathematical equation (3) by letting the first weighting function $W_{mq}$ be given by the following mathematical equation (2).

$$W_{mq} = \frac{H_{mq}^*}{\left(\sum_{m=1}^{M} |H_{mq}|^2\right)^{1/2}} \qquad (2)$$

$$y_{Tq} = \left(\sum_{m=1}^{M} |H_{mq}|^2\right)^{\frac{1}{2}} \cdot x_q \qquad (3)$$

As a result, the application of the first weighting function $W_{mq}$ makes an output power of the total signal $y_{Tq}$ equal to a power summation of all of the M ports 112. In other words, an effective gain of the whole subarrays 111 is equal to the summation of all directive gains of the M subarrays 111, such that the total signal $y_{Tq}$ are modulated to have a constellation that is same as the constellation of the unknown RF signal $x_q$. The way to generate the first weighting function $W_{mq}$ is called maximal ratio combining (MRC) method.

Design for Pattern Overlapped Subarrays

Assume a subantenna has a 3 dB beamwidth $\Delta\alpha_{3\ dB}$. The steering angle of the $m^{th}$ subantenna is denoted by $\alpha_m$. The angular difference of the steering angles between the adjacent subarrays is given by $$\Delta\alpha = \alpha_m - \alpha_{m-1}. \text{ Let } \Delta\alpha = \frac{1}{x}\Delta\alpha_{3dB}.$$

We define an antenna with highly overlapped pattern when x≥1.5, and loosely overlapped pattern when x≤1. It has been proved that after MRC, the effective gain of the whole antenna is given by $$G_T = \sum_m G_m,$$

where $G_m$ is the directional gain at the user's direction of the $m^{th}$ subantenna. It is clear that the higher the pattern overlapped, the higher the effective gain. The effective gain is about x times of the gain of a single subantenna. However, the more the overlapped, the greater the total aperture size of the whole antenna. In the following simulation we give examples of x=3 and x=1.

In case of each subarray 111 including six antenna elements, the beam pattern of the m-th of the M subarrays 111 can be expressed by the following mathematical equation (4).

$$G_m(\phi)=6 \text{ Sinc}^2(3\pi \text{ Sin}(\phi-\alpha_m)) \qquad (4)$$

In the mathematical equation (4), $\alpha_m$ is the beam direction of the steered beam of millimeter wave, and is calculated by using formula of sinc(x)=sin x/x. It is worth noting that the steered beam radiated by the m-th of the M subarrays 111 has a null to null beamwidth, which is twice the angular separation from which the magnitude of the radiated beam pattern decreases to zero (negative infinity dB) away from the main beam. Therefore, the null to null beamwidth and a 3 dB beamwidth of the steered beam radiated by the m-th of the M subarrays 111 can be calculated by using the following mathematical equations (5) and (6), respectively.

$$\Delta\phi_{0-0} = 2\Delta\alpha_0 = 2\sin^{-1}\left(\frac{1}{3}\right) = 37.8° \quad (5)$$

$$\Delta\phi_{3dB} \cong \frac{1}{2}\Delta\alpha_{0-0} = \sin^{-1}\left(\frac{1}{3}\right) = 18.9° \quad (6)$$

By letting $$\alpha_m - \alpha_{m-1} = \frac{1}{3}\Delta\alpha_0 = \frac{1}{3}\Delta\alpha_{3dB} = \frac{1}{6}\Delta\alpha_{0-0} = 6.3°,$$

each two neighboring ones of the M beam patterns would have a highly overlap. After assuming an angular coverage of interest is $\Delta\beta=60°$, the numeric value of "M" can be calculated by using the following mathematical equation (7).

$$M = \left\lfloor\frac{\Delta\beta}{\Delta\alpha}\right\rfloor + 1 = \left\lfloor\frac{60}{6.3}\right\rfloor + 1 = 10 \quad (7)$$

Subsequently, the steering angle (beam direction) $\alpha_m$ of the $m^{th}$ subarray can be calculated by using the following mathematical equation (8).

$$\alpha_m = 90° - \frac{6.3°}{2} + \left(m - \frac{M}{2}\right) \times 6.3° \quad (8)$$

Figure 6A:
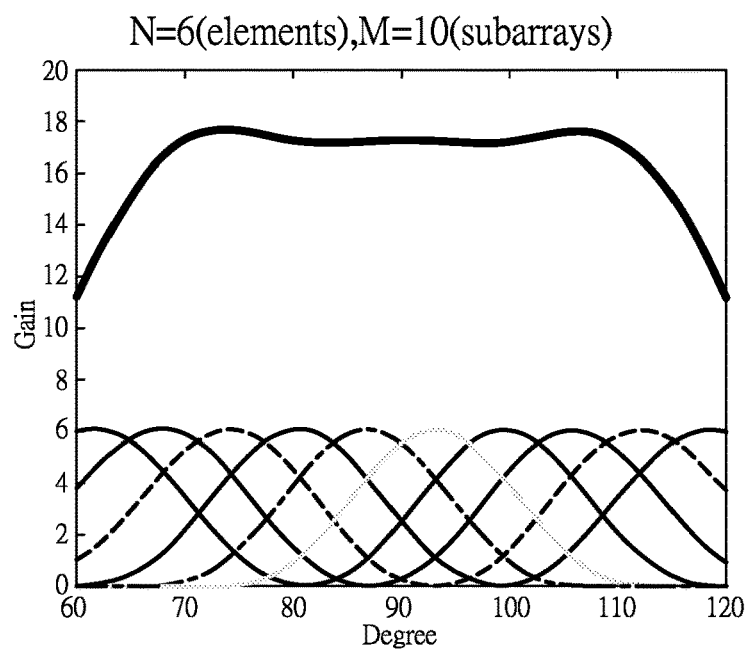
FIG. 6A shows a measurement data of steering angle versus Gain of antenna arrays, where each two beam patterns of the antenna arrays highly overlap to each other.

FIG. 6A shows a measurement data of steering angle $\alpha_m$ versus Gain of the antenna array 11. On the contrary, by letting $$\alpha_m - \alpha_{m-1} = \Delta\alpha_{3dB} = \frac{1}{2}\Delta\alpha_{0-0} = 18.9°,$$

each two neighboring ones of the M beam patterns would have a loosely overlap. After assuming an angular coverage of interest is $\Delta\beta=60°$, the numeric value of "M" can be calculated by using the following mathematical equation (9).

$$M = \left\lfloor\frac{\Delta\beta}{\Delta\alpha}\right\rfloor + 1 = \left\lfloor\frac{60}{18.9}\right\rfloor + 1 = 4 \quad (9)$$

Subsequently, the steering angle (beam direction) $\alpha_m$ of the $m^{th}$ subarray can be calculated by using the following mathematical equation (10).

$$\alpha_m = 90° - \frac{18.9°}{2} + \left(m - \frac{M}{2}\right) \times 18.9° \quad (10)$$

Figure 6B:
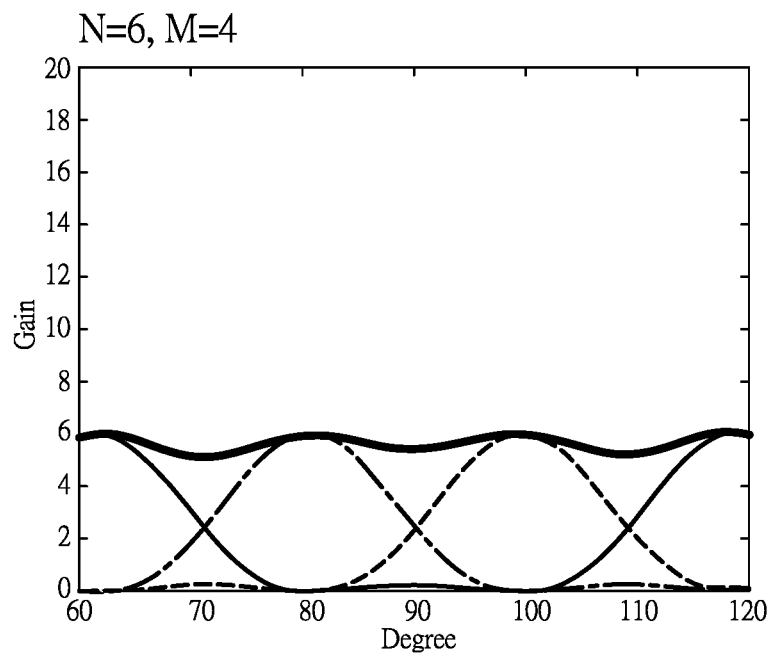
FIG. 6B shows a measurement data of steering angle versus Gain of antenna arrays, where each two beam patterns of the antenna arrays loosely overlap to each other.

FIG. 6B shows a measurement data of steering angle $\alpha_m$ versus Gain of the antenna array 11. Therefore, it can find that the effective gain of the whole subarrays 111 shown in FIG. 6A is largely greater than the effective gain of the whole subarrays 111 shown in FIG. 6B by around three times. That is, to particularly arrange each two of the M beam patterns highly overlapping each other is apparently helpful in enhancing the effective gain of the whole subarrays 111 within the angular coverage of interest.

Figure 6C:
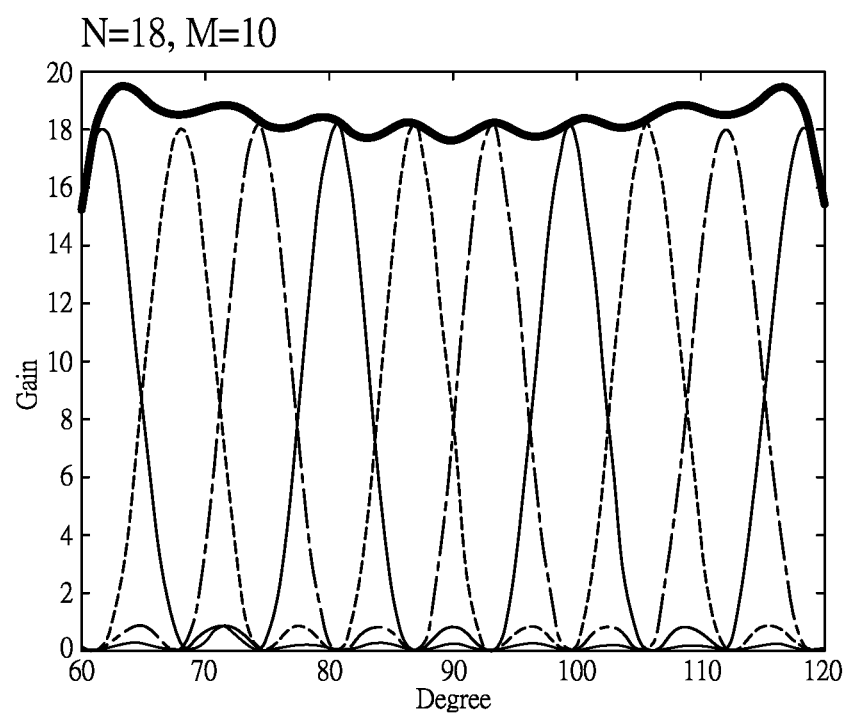
FIG. 6C shows a measurement data of steering angle $\alpha_m$ versus Gain of the antenna array.

FIG. 6C shows a measurement data of steering angle $\alpha_m$ versus Gain of the antenna array 11. To obtain the same effective gain as that of the highly overlapped type antenna, it is able to use a loosely overlapped type array 11 but each subarray 111 has 3 times of array gain or number of elements. The respective subarray patterns and the resultant effective gain pattern are shown in FIG. 6C.

Baseband Signal Processor for the Single User Case

I. Uplink

In the maximum ratio combining analysis, we neglect the effect of channel estimation error and the thermal noise. In fact, the signal received by the $m^{th}$ subantenna when the pilot signal $x_{pq}$ is transmitted is given by $$y_{mpq} = H_{mq} \cdot x_{pq} + n_{mpq}, \tilde{H}_{mq} = \frac{y_{mpq}}{x_{pq}} = H_{mq} + \frac{n_{mpq}}{x_{pq}} = H_{mq} + \Delta H_{mq}$$

Where $n_{mpq}$ is the noise at the $m^{th}$ subantenna when the pilot signal is transmitted. We use $\tilde{H}_{mq}$ to construct the weighting function, i.e.

$$W_{mq} = \frac{\tilde{H}^*_{mq}}{\left(\Sigma|\tilde{H}_{mq}|^2\right)^{\frac{1}{2}}}$$

When the unknown signal $x_q$ is transmitted, the signal received at the $m^{th}$ subarray is $$y_{mq} = H_{mq} \cdot x_q + n_{mq}$$

After MRC, the output signal is $$y_{Tq} = \sum W_m \cdot y_{mq} = \sum \frac{\tilde{H}^*_{mq}(H_{mq}x_q + n_{mq})}{\left(\Sigma|\tilde{H}_{mq}|^2\right)^{\frac{1}{2}}}, \quad (11)$$

$$H_{mq} = \tilde{H}_{mq} - \Delta H_{mq} = \left(\Sigma|\tilde{H}_{mq}|^2\right)^{\frac{1}{2}} \cdot x_q + \frac{\sum \tilde{H}^*_{mq}(-\Delta H_{mq}x_q + n_{mq})}{\left(\Sigma|\tilde{H}_{mq}|^2\right)^{\frac{1}{2}}}$$

The first term is the desired signal, the second term is the noise due to channel estimation error and thermal noise. The signal power is $\Sigma|H_{mq}|^2|x_q|^2$, and the average power of the second term is $$P_n = \frac{\Sigma \tilde{H}^*_{mq} \cdot (-\Delta H_{mq}x_q + n_{mq}) \cdot \Sigma \tilde{H}^*_{mq}(-\Delta H^*_{mq}x^*_q + n^*_{mq})}{\Sigma|\tilde{H}_{mq}|^2} \quad (12)$$

Assume $$|x_{pq}| = |x_q| = 1, \Delta H_{mq} = \frac{n_{mpq}}{x_{pq}} = n'_{mpq}.$$

Since the noise terms $n_{mpq}'$ and $n_{mq}$ are all independent one another, i.e., $$E\{n'_{mpq} \cdot n'_{m'pq}\} = E\{n_{mq} \cdot n_{m'q}\} = 0, \quad \forall m \neq m'$$

$$E\{n'_{mpq} \cdot n_{m'q}\} = 0, \quad \forall m \text{ and } m'$$

$$E\{n'_{mpq} \cdot n'^{*}_{mpq}\} = E\{n_{mq} \cdot n^{*}_{mq}\} = \sigma^2, \quad \text{for all } m$$

It can be proved that the average power of $P_n$ is equal to $$P_n = 2\sigma^2$$

Therefore, after MRC, the output signal to noise ratio is $$SNR = \frac{\sum |H_{mq}|^2}{2\sigma^2} \quad (13)$$

It is known that the SNR after MRC is equal to the summation of the SNR of each port if the channel response is perfectly estimated. However, if the channel response has an estimation error due to the thermal noise, the resultant SNR after MRC will be degraded by 3 dB.

II. Downlink

The downlink signal transmission has two different systems: the time division duplex (TDD) system and the frequency division duplex (FDD) system. For the TDD system, downlink and uplink use the same carrier frequencies and they have the same channel frequency responses. While the FDD system uses different carrier frequencies for uplink and downlink transmission. They have different channel responses in general.

Block diagram for downlink baseband signal processor is shown in FIG. 5C-5D. The signal to be transmitted at the $q^{th}$ subcarrier $x_q'$ is divided into M paths. Each path multiplies a weighting function $w_{mq}'$ and becomes $w_{mq}'x_q'$. All signals $w_{mq}'x_q'$, q=1, . . . , Q with the same index m will follow the downlink block diagram of FIG. 1 and become the time-domain signals $y_m(t)$, which is finally transmitted by the $m^{th}$ subantenna. The signal received by the user will be the superposition of the convolution of the channel impulse response of the $m^{th}$ subantenna and its transmitted signal, i.e., $z(t) = \Sigma_m h_m(t) * y_m(t)$ Signal Processor for the TDD Systems For a TDD system, uplink and downlink use the same carrier frequencies and they have the same channel responses. In this case, the downlink weighting function $W_{mq}'$ can be set to be the same as that of the uplink, i.e., $$W'_{mq} = \frac{\tilde{H}^{*}_{mq}}{\left(\sum_{m=1}^{M} |\tilde{H}_{mq}|^2\right)^{1/2}} \quad (14)$$

The channel responses from the $m^{th}$ subantenna to the user is also $H_{mq}$. The total signal received by the user at the frequency domain is $$Z_{T_q} = \sum_{m=1}^{M} W'_{mq} \cdot x'_q \cdot H_{mq} + n'_q = \quad (15)$$

$$\sum_{m=1}^{M} \frac{\tilde{H}^{*}_{mq} \cdot H_{mq} \cdot x'_q}{\left(\sum |\tilde{H}_{mq}|^2\right)^{\frac{1}{2}}} + n'_q = \left(\sum_{m=1}^{M} |\tilde{H}_{mq}|^2\right)^{\frac{1}{2}} \cdot x'_q + \frac{\Delta H_{mq} x'_q + n'_q}{\left(\sum |\tilde{H}_{mq}|^2\right)^{\frac{1}{2}}}$$

Therefore, the uplink and downlink have the same transmission performance.

Signal Processor for the FDD Systems

For the FDD system, uplink and downlink have a constant difference in carrier frequency, and their channel responses are usually different. In most cases, the uplink weighting function cannot be directly applied to the downlink transmission. Theoretically, each subantenna can transmit pilot signals to the user alternatively, the user measure the downlink channel response $H_{mq}'$ and transmit back the information of $H_{mq}'$ to the basestation. However, it requires many bits to represent the information $H_{mq}'$ and the overhead costs too much. In the following we propose an another approximation method, we only transmit back the quantized phase information of $H_{mq}'$ but no its magnitude information. Our proposed method is as follows:

1. Each subantenna transmits the pilot signals alternatively and the user measure the downlink channel responses $H_{mq}'$
2. The user extracts the phase of $H_{mq}'$. The phase is quantized into P states with $P=2^p$, p is a positive integer.

$$\text{Let } H'_{mq} = |H'_{mq}| e^{j\phi_{mq}} \quad \Delta\phi = \frac{360°}{P}$$

The quantized state is given by $$l_{mq} = \left\lfloor \frac{\phi_{mq}}{\Delta\phi} \right\rfloor.$$

3. The quantized states $l_{mq}$ are then transmitted back to the basestation. $l_{mq}$ can be represented by p bits.
4. The downlink weighting function of the $m^{th}$ subantenna is given by $$W'_{mq} = |\tilde{H}_{mq}| \exp(-j l_{mq} \cdot \Delta\phi) \Big/ \left(\sum_{m=1}^{M} |\tilde{H}_{mq}|^2\right)^{1/2} \quad (16)$$

That is, we use the magnitude of the uplink channel response and the conjugate of the quantized phase of the downlink channel response to represent the downlink weighting function.

With the above algorithm, the signal received by the user will be $$y'_T = \sum_m W'_{mq} \cdot H'_{mq} x'_q = \sum_m |\tilde{H}_{mq}| |H'_{mq}| \exp[j(\phi_{mq} - l_{mq} \cdot \Delta\phi)] x'_q \quad (17)$$

It is noted that the phase term of the above equation satisfies $$0 \leq \phi_{mq} - l_{mq} \cdot \Delta\phi \leq \frac{360°}{P}$$

The greater the P is, the smaller the phase error. If P is large enough, like P=32, then the signals from each subantenna can be considered almost co-phased. The resultant channel gain will be much increased. Performance of the above algorithm will be close to that of done by the MRC.

In the above method, pilot signals are transmitted by each subantenna alternately, and the user send back the required quantization information to the basestation. If the number of subantennas is large, it will require too much overhead.

Baseband Signal Processing for the Multiuser Case

Assume there are N users sharing the same spectral frequencies simultaneously. Let the index of the subcarrier frequency be q. The channel response from the $n^{th}$ user to the $m^{th}$ subantenna at the $q^{th}$ subcarrier be denoted by $H_{mnq}$. When the $n^{th}$ user transmits a pilot signal $x_p$, the signal received by the $m^{th}$ subantenna after A/D, the serial to parallel conversion and FFT transformer the frequency-domain signal is $y_{mpq}$.

$$y_{mpq} = H_{mnq} \cdot x_p + n_{mpq}$$

where $H_{mnq}$ is the channel response from the $n^{th}$ user to the $m^{th}$ subantenna at the $q^{th}$ subcarrier and $n_{mpq}$ is the noise term. Since $x_p$ is known to the basestation, estimation of $H_{mnq}$ is given by $$\tilde{H}_{mnq} = \frac{y_{mpq}}{x_p} = H_{mnq} + \frac{n_{mpq}}{x_p} = H_{mnq} + n'_{mpq}$$

Assume $|x_p|=1$, we have $E\{|n_{mpq}|^2\}=E\{|n_{mpq}'|^2\}=\sigma^2$ for all m and q. When every user transmits his own pilot signal sequentially, we can obtain $\tilde{H}_{mnq}$.

When each user transmits his data signal $x_{nq}$ simultaneously to the basestation, the signal received by the $m^{th}$ port can be expressed by $$y_{mq} = \sum_{n=1}^{N} H_{mnq} \cdot x_{nq} + n_{mq} \quad (18)$$

or in matrix form $$\bar{y}_q = H_q \bar{x}_q + \bar{n}_q \quad (19)$$

where $\bar{y}_q = [y_{1q}, \ldots, y_{Mq}]^T$ $$H_q = \begin{bmatrix} H_{11q} & \cdots & H_{1Nq} \\ \vdots & \ddots & \vdots \\ H_{M1q} & \cdots & H_{MNq} \end{bmatrix}$$

$$\bar{x}_q = [x_{1q}, \ldots, x_{Nq}]^T$$

$$\bar{n}_q = [n_{1q}, \ldots, n_{Mq}]^T$$

Where the subscript T represents the operation of transpose.

At the baseband processor, the digitized vector $\bar{y}_q$ is multiplied by a weighting matrix $W_q$, where $W_q$ is $$W_q = \begin{bmatrix} W_{11q} & \cdots & W_{M1q} \\ \vdots & \ddots & \vdots \\ W_{1Nq} & \cdots & W_{MNq} \end{bmatrix}$$

The output of the signal processor is the estimate $\tilde{\bar{x}}_q$ of the transmitted signal $\bar{x}_q$ $$\tilde{\bar{x}} = W_q \cdot \bar{y}_q = W_q \cdot (H_q \bar{x}_q + \bar{n}_q) \quad (20)$$

The purpose of the baseband signal processor is to determine the weighting matrix $W_q$ so that the estimated vector $\tilde{\bar{x}}_q$ can be as close as possible to the transmitted signal vector $\bar{x}_q$.

Interference Cancellation Algorithms for Uplink MIMO (Multiple Input Multiple Output)

In OFDM systems, we assume all signals have been converted to the frequency domain and the signal processing is on the subcarrier basis. To simplify the notation, in the following, we will omit the subscript q. The analysis is valid for all Q subcarriers.

If we neglect the effect of thermal noise, we have $$\tilde{\bar{x}} = W \cdot \bar{y} = w \cdot H \bar{x}$$

If $\tilde{\bar{x}}$ is to be equal to $\bar{x}$, then W should be equal to $$\tilde{\bar{x}} = W H \bar{x} = \bar{x}$$

$$W = (H^H H)^{-1} H^H \quad (21)$$

where the subscript H represents the operation of Hermitian, or transpose and conjugate. Clearly $W \cdot H = (H^H H)^{-1} H^H \cdot H = I_N$ where $I_N$ is the N×N Identity matrix.

Ideally, if the channel response matrix H can be exactly obtained, the transmitted vector $\bar{x}$ can be exactly reconstructed. However, due to the thermal noise and the pilot signals are not transmitted for every subcarrier frequency and every instant, we only measure the channel responses at certain subcarriers and certain instants. The responses at other subcarriers and other time are usually obtained through interpolation. The thermal noise and interpolation error will result in $W \cdot H \neq I_N$.

Assume the estimated channel matrix $\tilde{H}$ and the real channel matrix H have an error difference, i.e., $\tilde{H} = H + \Delta H$. When the data vector $\bar{x}$ is transmitted, the signal vector received is $$\bar{y} = H \cdot \bar{x} + \bar{n}, \bar{n} = [n_1, \ldots, n_m]^T$$

we use the estimated channel matrix $\tilde{H}$ to construct the weighting matrix W, i.e., $$W = (\tilde{H}^H \tilde{H})^{-1} \cdot \tilde{H}^H$$

The reconstructed signal vector is then $$\tilde{\bar{x}} = W \cdot \bar{y} = (\tilde{H}^H \cdot \tilde{H})^{-1} \tilde{H}^H \cdot (H \bar{x} + \bar{n}) \quad (22)$$

$$= (\tilde{H}^H \cdot \tilde{H})^{-1} \tilde{H}^H [(\tilde{H} - \Delta H) \bar{x} + \bar{n}]$$

$$= I_N \bar{x} - W \cdot \Delta H \bar{x} + W \bar{n}$$

$$\tilde{x}_n = x_n + \sum_{m=1}^{M} \sum_{l=1}^{N} W_{mn} \cdot \Delta H_{ml} \cdot x_l + \sum W_{mn} \cdot n_m \quad (23)$$

In the above expression, the first term is the desired signal, the second term is the interference due to channel estimation error and the multiple access interference (MAI), the third term is due to the thermal noise. Assume $E\{|x_n|^2\}=1$ for all n, the average power of the desired signal is $S_n = E\{|x_n|^2\} = 1$, the average interference power is $$J_n = \overline{\left(\sum_{m=1}^{M}\sum_{l=1}^{N} W_{mn} \cdot \Delta H_{ml} \cdot x_l\right)\left(\sum_{m=1}^{M}\sum_{l=1}^{N} W_{mn} \cdot \Delta H_{ml} \cdot x_l\right)^*} \quad (24)$$

The average noise power $$N_n = \overline{\sum_{m=1}^{M} W_{mn} \cdot n_m \cdot \left(\sum_{m=1}^{M} W_{mn} \cdot n_m\right)^*} \quad (25)$$

The SINR (signal to interference plus noise ratio) of the $n^{th}$ user is $$(SINR)_n = \frac{S_n}{J_n + N_n} \quad (26)$$

If we assume the channel estimation error is only due to the thermal noise, i.e., $\Delta H_{mn} = n_{mn}$, where $n_{nm}$ is the thermal noise of the $m^{th}$ subantenna when the pilot signal of the $n^{th}$ user is transmitted. We further assume the thermal noise at different subantennas and different time instant are all independent each other, i.e., $$E\{n_{nm} \cdot n^*_{nm'}\} = 0, \quad \text{for } m \neq m'$$

$$E\{n_m \cdot n^*_{m'}\} = 0, \quad \text{for } m \neq m'$$

$$E\{n_{nm} \cdot n^*_{nm}\} = E\ \{n_m \cdot n^*_m\} = \sigma^2$$

It can be shown that $$J_n = N \sum_{m=1}^{M} |W_{nm}|^2 \sigma^2$$

$$N_n = \sum_{m=1}^{M} |W_{nm}|^2 \sigma^2$$

and $(SINR)_n$ is equal to $$(SINR)_n = \frac{1}{(N+1)\sum_{m=1}^{M} |W_{nm}|^2 \sigma^2} \quad (27)$$

From the above derivation, we can predict the SINR of each user directly from the weighting matrix $W = (\tilde{H}^H \tilde{H})^{-1} \tilde{H}^H$ In Summary, for the uplink interference cancellation algorithm, the procedure is as follows:

1. Each user transmits pilot signals $x_p$, the $m^{th}$ subantennas measures and estimates the channel responses $\tilde{H}_{mnq}$
2. Construct the weighting function matrix $W = (\tilde{H}^H H)^{-1} \cdot H^H$ 3. Predict the average SINR of each user $$(SINR)_n = \frac{1}{\left(\sum_{m=1}^{M} |W_{nm}|^2\right)(N+1)\sigma^2}$$

4. If $(SINR)_n <$ threshold, which means the transmission performance of the $n^{th}$ user is not acceptable. Then we can consider to withdraw the $n^{th}$ user from the sharing group.
5. If SINR of all users are greater than the threshold, the transmitted signal vector is obtained by $\bar{\tilde{x}} = W \cdot \bar{y}$ Signal Processing for Downlink MIMO There are two different systems for the downlink MIMO: the time division duplex (TDD) system and the frequency division duplex (FDD) system.

Block diagram of the downlink signal transmission is shown in FIG. 5B-5C. The signal vector to be transmitted to the N users is $\bar{x}' = (x_1', x_2', \ldots, x_N')$. The downlink baseband signal processor is denoted by a M×N matrix W'. The output is a M×1 vector $W'\bar{x}'$. The $m^{th}$ element of $(W'\bar{x})_q$ of all subcarriers are grouped together, through the IFFT operator, the parallel to serial conversion unit, the cyclic prefix insertion, and a D/A converter, and become the time-domain analog signal. It is then upconverted to the RF band and amplified by a power amplifier, finally feed to the corresponding subantenna. The input vector in the frequency domain to the M port subantennas is denoted by $\bar{y}' = W'\bar{x}$. The frequency-domain downlink propagation matrix from the M subantennas to the N users is denoted by $H_d$. The frequency-domain digitized signal vector at the baseband received by the N users is $\bar{z} = H_d^T \cdot W' \bar{x}' + \bar{n}$.

TDD Systems

First we neglect the effect of thermal noise and channel estimation error, then we have $H_d = H$, or $H_{dmn} = H_{mn}$. That is, the downlink and uplink have the same channel response. If the received vector $\bar{z}_d$ can perfectly reconstruct the transmitted vector $\bar{x}'$, then $$\bar{z}_d = H_d^T \cdot W' \cdot \bar{x}' = H^T \cdot W' \cdot \bar{x}' = I_N \bar{x}'$$

$$H^T \cdot W' = I_N$$

and $W' = H^* \cdot (H^T \cdot H^*)^{-1}$

However, the basestation only has the estimated channel matrix $\tilde{H}$. The downlink weighting function matrix should be $W' = \tilde{H}^* (\tilde{H}^T \tilde{H}^*)$. Assume the channel estimation has an estimation error $\Delta H$, then $$\tilde{H} = H + \Delta H \text{ or } H = \tilde{H} - \Delta H$$

where H is the true channel response matrix, $\Delta H$ is the error matrix due to other imperfect factors. The downlink signal vector received by the N users is $$\bar{z} = H^T \cdot W' \bar{x}' + \bar{n}'$$

$$= (\tilde{H}^T \cdot \Delta H^T) \cdot \tilde{H}^* (\tilde{H}^T \cdot \tilde{H}^*) \cdot \bar{x}' + \bar{n}'$$

$$= I_N \bar{x}' \cdot \Delta H^T \cdot \tilde{H}^* (\tilde{H}^T \cdot \tilde{H}^*) \cdot \bar{x}' + n'$$

In the above equation, the first term is the transmitted signal vector itself, the second term will cause MAI, and the third term is the thermal noise. If $\Delta H^T$ is only due to thermal noises, it can be proved that the $(SINR)_n$ has the same expression of Eq. (27).

Downlink Pilot Signal Design and SINR Evaluation

For the uplink transmission, each user transmits its own pilot signal sequentially, and each subantenna receives the pilot signal and estimates the channel responses $\tilde{H}_{mn}$. For the TDD system, uplink and downlink have the same carrier frequency and therefore the same channel responses. It needs not to estimate the downlink channel responses. For the downlink pilot signal transmission, we propose the following procedure:

1. We transmit the pilot signal vector $\bar{x}_{1p}^T=(x_{1p}, 0, \ldots, 0)$, $\bar{x}_{2p}^T=(0, x_{2p}, \ldots, 0), \ldots, \bar{x}_{Np}^T=(0, 0, \ldots x_{Np})$ sequentially to the N users. The pilot symbols $x_{np}$ for all n are known to all users. When the pilot vector $\bar{x}_{np}$ is transmitted, the signal vector received by the N users is denoted by $\bar{z}_{np}$ $$z_{np}^T = (z_{n1}, z_{n2}, \ldots, z_{nN})$$

$$\text{Let } \Delta H^T \cdot \tilde{H}^*(\tilde{H}^T \cdot \tilde{H}^*)^{-1} = A' = \begin{pmatrix} A_{11} & \cdots & A_{1N} \\ \vdots & \ddots & \vdots \\ A_{N1} & \cdots & A_{NN} \end{pmatrix} = \Delta H^T \cdot W'$$

$$z_{np}^T = H^T \cdot W' \cdot x_n + n'_{np}$$
$$= I_N x_{np} + \Delta H^T \cdot \tilde{H}^*(\tilde{H}^T \cdot \tilde{H}^*) \cdot x_{np} + n'_{np}$$
$$= I_N x_{np} + A' x_{np} + n'_{np}$$

$$\begin{pmatrix} z_{1np} \\ \vdots \\ z_{nnp} \\ \vdots \\ z_{Nnp} \end{pmatrix} = \begin{pmatrix} 0 \\ \vdots \\ x_{np} \\ \vdots \\ 0 \end{pmatrix} + \begin{pmatrix} A_{1n} x_{np} \\ \vdots \\ A_{Nn} x_{np} \end{pmatrix} + \begin{pmatrix} n'_1 \\ \vdots \\ n'_N \end{pmatrix}$$

$$z_{n'np} = A_{n'n} x_{np} + n'_{n'} \text{ for } n' \neq n$$
$$z_{nnp} = x_{np} + A_{nn} x_{np} + n'_n$$

In the above, $z_{n'np}$ is the signal received by the n'th user when the base station intends to transmit a pilot signal to the $n^{th}$ user. It can be considered as the possible MAI that the $n^{th}$ user interferes to the n'th user. While $z_{nnp}$ is the desired signal received by the $n^{th}$ user. Since the pilot signals are known to all users, the $n^{th}$ user can estimate the channel gain $|1+A_{nn}|^2$.

When the unknown data signal vector $\bar{x}=(x_1, \ldots, x_N)$ is transmitted, the signal vector received by the N users will be $$\bar{z} = I_N \bar{x} + A' \bar{x} + \bar{n}'$$

$$z_n = (1+A_{nn})x_n + \Sigma_{n' \neq n} A_{nn'} + n_n'$$

where the first term is the desired signal, the second term is the MAI and the third term is the thermal noise. The average SINR of the $n^{th}$ user is given by $$(SINR)_n = \frac{|1+A_{nn}|^2}{\sum_{n' \neq n} |A_{nn'}|^2 + \sigma^2} \quad (28)$$

It is noted that during the transmission of pilot signals, each user can measure his desired signal power and the MAI power. Therefore, he can estimate his own average SINR. If the estimated SINR is below a threshold, he can withdraw from the sharing group.

Signal Processing for FDD Systems

For the FDD system, uplink and downlink use different carrier frequencies, and can have very different channel responses. Because the base station doesn't have information of the downlink channel responses, the weighting function cannot be preassigned. A possible way is as follows:

1. Each subantenna transmits pilot signals to all users. Each user measure the down link channel responses $H'=\{H_{mn}'\}$
2. Each user transmits back information of the measured downlink responses to the base station.
3. The downlink weighting function is given by $$W' = H'^* \cdot (H'^T \cdot H'^*)$$

Disadvantage of the above method is that it requires to transmit back the amplitude and phase information, especially when the numbers of subantennas and users are large.

For the single user case we have proposed an approximation method to reduce the overhead of back transmission. We only transmit back the quantization phase information of the downlink channel responses. The downlink weighting functions are approximated by using the magnitude of the uplink channel responses and the quantized phase of the downlink channel response to construct the weighting function. In the single user case, we can have good transmission performance with the above approximation. However, in the multiusers case, we not only have to increase the level of the desired signals, but also have to cancel the MAI. If the uplink and downlink channel responses are very different, i.e., All cannot be neglected, then the MAI cannot be effectively cancelled.

We summarize the downlink MIMO signal processing as follows:

1. Each subantenna transmits pilot signals to all users, and each user transmits back the measured channel responses. The basestation then construct the weighting function according to the downlink channel responses measured by all users.

Numerical Examples

Consider a basestation antenna consisting of multiport subarrays. Each subarray, has 6×6 elements and steers to $(\theta_m=90°, \phi_m=\alpha_m)$. The radiation pattern can be expressed by $$G_m(\theta,\phi)=36 \text{ Sinc}^2(3\pi \text{ Sin}(\theta-90°)) \cdot \text{Sinc}^2(3\pi \text{ Sin}(\phi-\alpha_m))$$

Assume the angular coverage $\Delta\beta$ of the users is from $\phi_{min}=60°$ to $\phi_{max}=120°$. The 3 dB beamwidth of the subarray is $$\Delta\alpha_{3dB} = \text{Sin}^{-1}\left(\frac{1}{3}\right) \cong 18.9°.$$

The difference between the adjacent steering angles is $\Delta\alpha=\frac{1}{3}\alpha_{3 \, dB}=6.3°$. The number of subarrays is $$M = \left\lfloor \frac{\Delta\beta}{\Delta\alpha} \right\rfloor + 1 = \left\lfloor \frac{60}{6.3} \right\rfloor + 1 = 10.$$

The steering angle of the $m^{th}$ subarray is $$\alpha_m = 90° - \frac{6.3°}{2} + \left(m - \frac{M}{2}\right) \times 6.3°, m = 1, 2, \ldots, 10$$

Assume each subarray is mounted on a constant-radius surface with radius=40 cm. The coordinates of the center of each subarray is given by $(r_m'=40 \text{ cm}, \theta_m'=90°, \phi_m'=\alpha_m)$. Assume users are randomly located at 30m<r<300m, $\theta$~90°, 60°<$\phi$<120°. The $n^{th}$ user is located at $(r_{n0}, \theta_{n0}=90°, \phi_{n0})$ where the subscript 0 represents the direct path component. Parameters of the $n^{th}$ user's multipath components are expressed by $(r_{np}, \alpha_{np}, \phi_{np}, \theta_{np}=90°)$ where p represents the $p^{th}$ multipath component, $r_{np}$ is the total distance travelled by the $p^{th}$ multipath component, $\alpha_{np}$ is the complex amplitude of the $p^{th}$ component arriving at the antenna center, $\phi_{np}$ is the direction of the $p^{th}$ components. These multipath parameters depend on the channel environments, for example, in open area or urban city, in country side or on street walk, at outdoors or indoors, with direct path being clear or obstructed, etc. In this example, we give the following parameters:

$$10\log(a_{n0}) = 10\log\left(\frac{P_n G_n \cdot \lambda^2}{(4\pi r_{n0})^2}\right) - L_{n0} \text{(in dB)}$$

where the first term of the right side is the Friss equation, $P_n$ and $G_n$ are the transmit power and antenna gain of the $n^{th}$ user, $L_{n0}$ is the loss of the direct path of the user, for example it is clear or has obstruction loss or any other loss, which is a random variable. $\alpha_{np}$ is given by $$10\log(a_{np}) = 10\log\left(\frac{P_n G_n \cdot \lambda^2}{(4\pi r_{np})^2}\right) - L_{np} \text{(in dB)}$$

$L_{np}$ is the loss of the $p^{th}$ component due to reflection loss, obstruction loss etc. It is also a random variable.

Consider the outdoor scenario. Let
$r_{n0}$ is randomly distributed in 30 m≤$r_{n0}$≤300 m
$r_{np}=r_{n0}+r_{np}'$, $r_{np}'$ is randomly distributed in 20 m≤$r_{n0}$≤100 m
$\phi_{n0}$ is randomly in 60°≤$\phi_{n0}$≤120°
$\phi_{np}=\phi_{n0}+\pi_{np}'$, $\phi_{np}'$ is randomly distributed in −10°≤$\phi_{np}'$≤10°
First, we assume $L_{n0}$ is randomly distributed in 0≤$L_{n0}$≤10 dB, which corresponds to the case that the direct path is clear or slightly obstructed.
$L_{np}$ is randomly in 15 dB≤$L_{np}$≤35 dB
$P_n$=20 dBm, $G_n$=2 dB (a mobile user uses a low gain antenna.)

The channel response of the $n^{th}$ user to the $m^{th}$ subarray can be expressed by $$H_{mnq} = \sum_{p=0}^{P} a_{np} \cdot \exp(jk_q r_{npm}) G_m(\phi_{np})$$

where $r_{npm}=[(r_{np} \cos \phi_{np}-r_0' \cos \alpha_m)^2+(r_{np} \sin \phi_{np}-r_0' \sin \alpha_m)^2]^{1/2}$ $r_{npm}$ is the distance of the $p^{th}$ multipath component of the $n^{th}$ user traveling to the center of the $m^{th}$ subarray, $k_q$ is given by $$k_q = k_0 + (q-1) \cdot \Delta k, \; \Delta k = \frac{2\pi \Delta f}{c}$$

Figure 7:
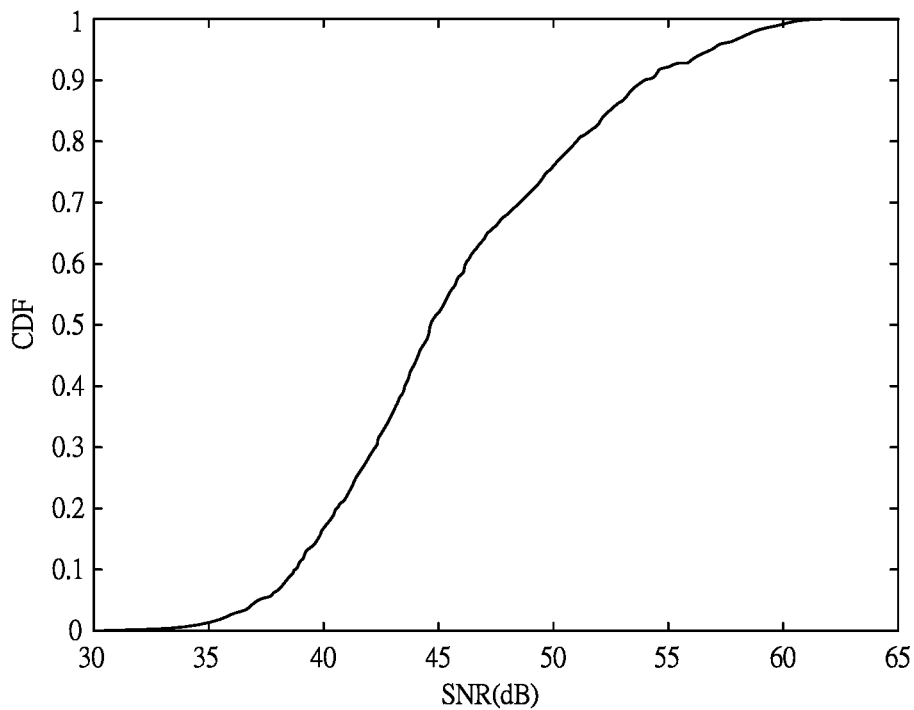
FIG. 7 shows a diagram for depicting a curve of SNR versus CDF, where the data are measured in the unlink path of the millimeter wave base station antenna system.

Assume the signal bandwidth is 300 MHz, the noise figure of the receiver is 5 dB, the noise power is $N$=(FkTB)=−174+5+85=−84 dBm The Single-User Case We randomly generate 1000 users, the parameters are generated according to the rules described above. For each user n, we theoretically calculated the channel responses $H_{mnq}$ for m=1, ..., 10, and q=1, ..., 1000, for $f_0$=30 GHz and $\Delta f$=100 kHz. For each n, q, we use MRC to obtain the resultant $$y_{Tnq} = \left(\sum_{m=1}^{10} |\tilde{H}_{mnq}|^2\right)^{1/2}$$

with $\tilde{H}_{mnq}=H_{mnq}+n_{mnq}$ where $n_{mnq}$ is the thermal noise, and find the corresponding SNR defined by $$(SNR)_{n,q} = 10\log\left(\frac{|y_{Tnq}|^2}{\sigma^2}\right),$$

with $\sigma^2$=−84 dBm. From all values of $(SNR)_{n,q}$ for n=1, ..., 1000, and q=1, ..., 1000, we plot the cumulative density function (CDF) of the SNR, the results are shown in FIG. 7.

The above simulation is the uplink performance. For downlink and TDD case, the system should have the same transmission performance.

For the FDD case, assume the uplink and downlink has a fixed carrier frequency difference $\Delta f_0$=1 GHz, $f_q'$=30 GHz+$\Delta f_0$+(q−1)$\Delta f$=31 GHz+(q−1)·100 KHz, q=1, ..., 1000. We theoretically calculate the uplink channel responses $H_{mnq}$ and the downlink channel responses $H_{mnq}'$. We use the exact downlink frequency responses and the approximation method described previously to find the weighting functions $W_{mnq}'$ and then calculate the downlink signal $y_{Tnq}'$. The approximation is the user transmits back the quantization quantity $I_{mnq}$ of the phase of the downlink channel response $H_{mnq}'$, and the weighting function $W_{mnq}'$ is set to $$W_{mnq}' = |H_{mnq}|\exp\left(-jI_{mnq}\frac{2\pi}{P}\right).$$

The downlink output is $$y_{Tnq}' = \sum_{m=1}^{M} W_{mnq}' \cdot H_{mnq}'$$

Figure 8:
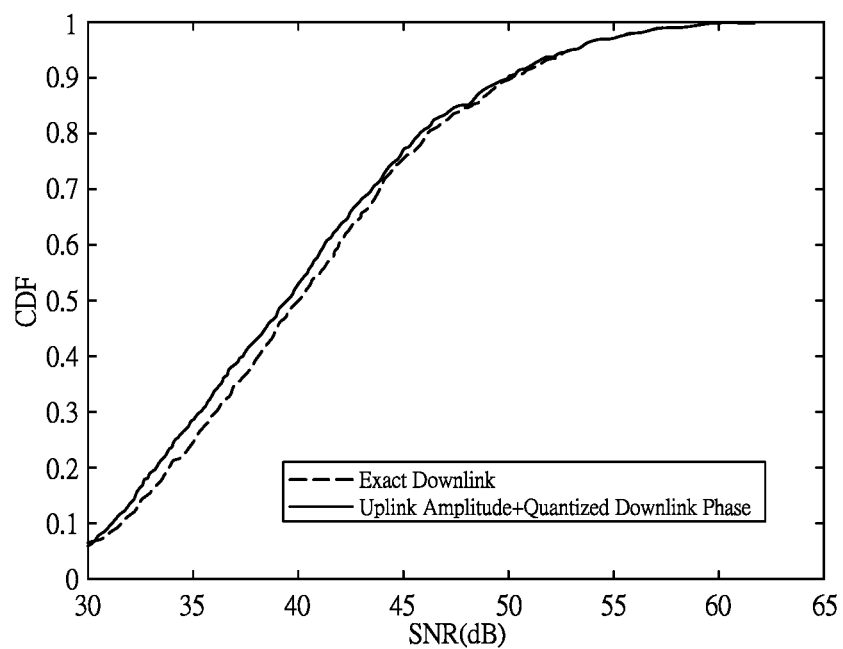
FIG. 8 shows a diagram for depicting measurement curve of SNR versus CDF, where the data are measured in the downlink path of the millimeter wave base station antenna system that is operated in TDD mode.

The CDF of SNR are plotted in FIG. 8. It is seen that the approximation method almost has the same performance as that of the exact method.

Next we consider the case that the direct path is seriously obstructed, for example, obstructed by the human body or a passing-by bus, then $L_{n0}$ can be greater than 20 dB.

Figure 9A:
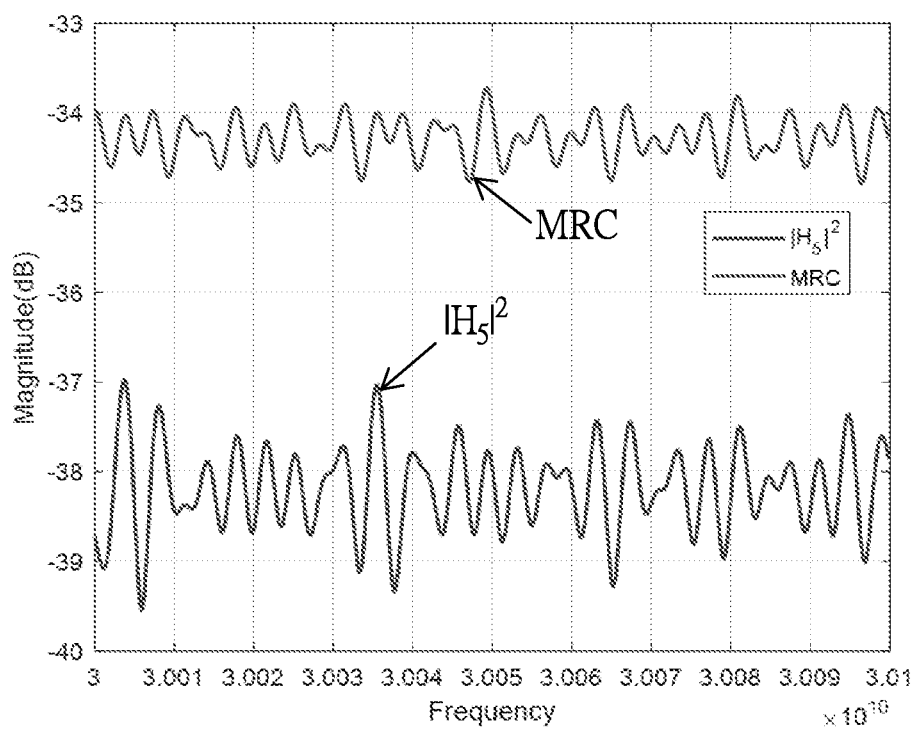
FIG. 9A shows a diagram for depicting curves of frequency versus magnitude (dB), where the data are measured under the direct path is clear.
Figure 9B:
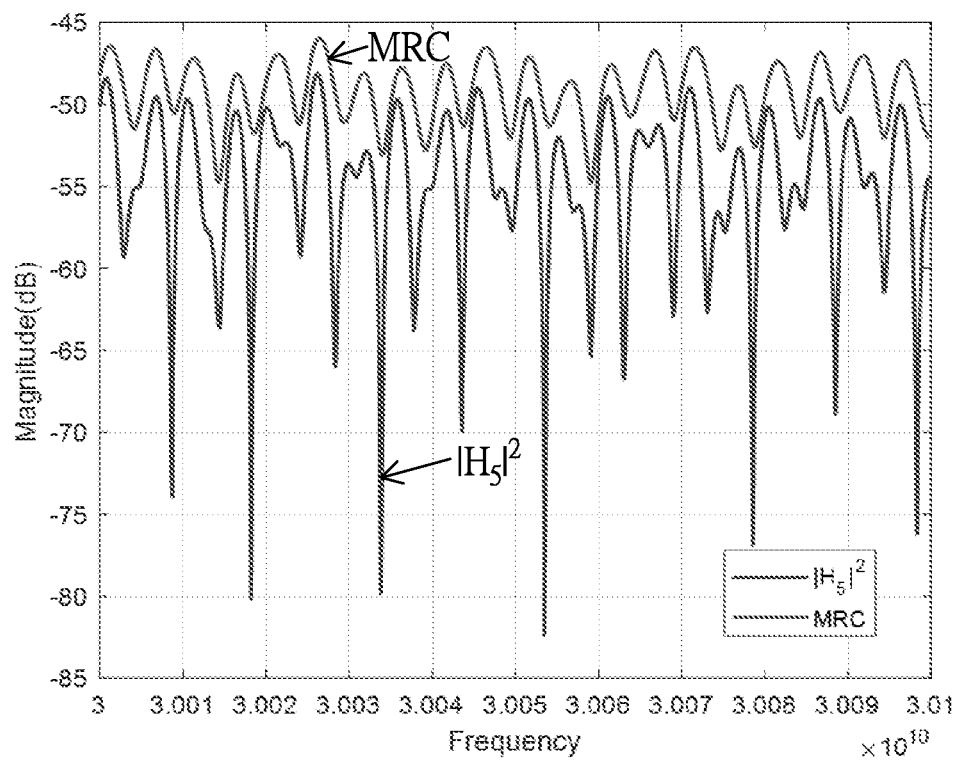
FIG. 9B shows a diagram for depicting curves of frequency versus magnitude (dB), where the data are measured under the direct path is obstructed with a loss of 25 dB.

In this situation, magnitude of the direct path is comparable to that of the multipath components. Interference of the direct path and other multipath components can result in deep fading. As a specific example assume a user is at $(r_{n0}$=150 m, $\phi_{n0}$=90°), $L_{n0}$=0 dB and 25 dB respectively, the random variable of $r_{np}'$, $\phi_{np}'$, $L_{np}$ are the same setting as the first example, the uplink channel responses $|H_{mnq}|^2$ at m=5, for $L_{n0}$=0 dB and 25 dB are shown in FIGS. 9A and 9B respectively. It is noted that the user's direction is covered by the mainlobes of the fifth subarray. Compare the plots of $|H_{mnq}|$ for $L_{n0}$=0 dB and $L_{n0}$=25 dB, the level of channel responses for $L_{n0}$=25 dB are not only much reduced, but there are seriously deep fadings at certain frequencies, and the variation can be as large as to 30 dB. After the MRC, the resultant responses are also shown in the figures. The levels are increased and much stable. The phenomenon of deep fading disappeared.

The Multiuser Case

Assume there are N users sharing the same time-frequency resources simultaneously. Each time we randomly generate the channel responses $H_{mnq}$ of the N users. For the uplink transmission, we construct the weighting matrix $W=(\tilde{H}^H\tilde{H})^{-1}\cdot\tilde{H}^H$ with $\tilde{H}_{mnq}=H_{mnq}+n_{mnq}$. Assume channel estimation error is only due to the thermal noise, then we have the average $$(SINR)_n = \frac{1}{(N+1)\sum_{m=1}^{M}|W_{nm}|^2\cdot\sigma^2}$$

Figure 10:
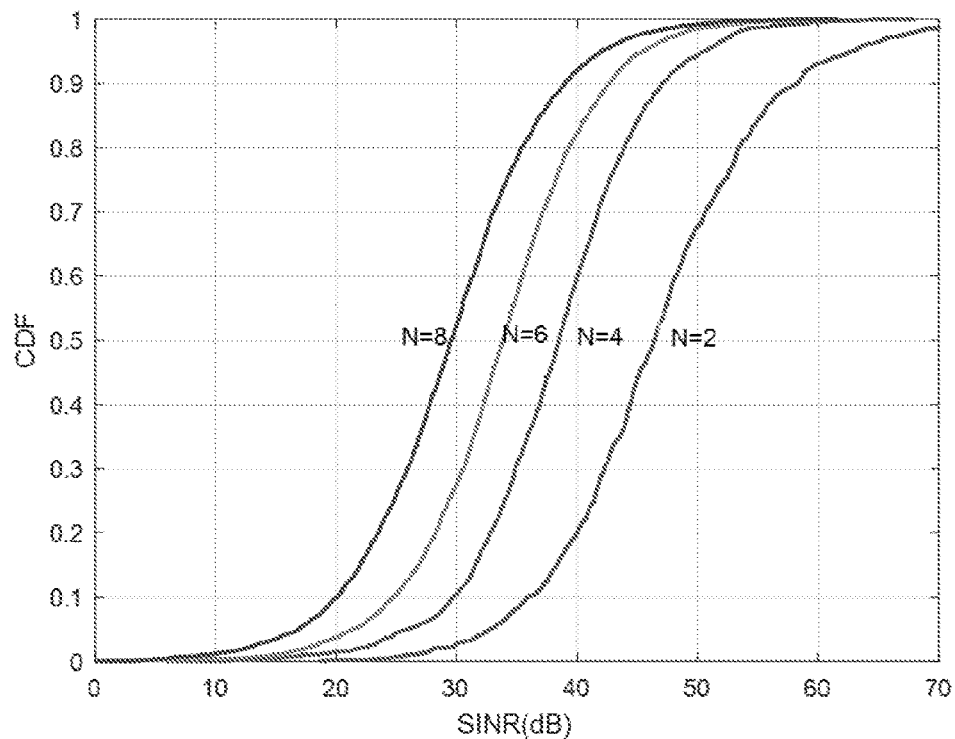
FIG. 10 shows a diagram for depicting curves of SINR versus CDF, where the data are measured in the uplink path of the millimeter wave base station antenna system that is operated under the multi-user case.
Figure 11A:
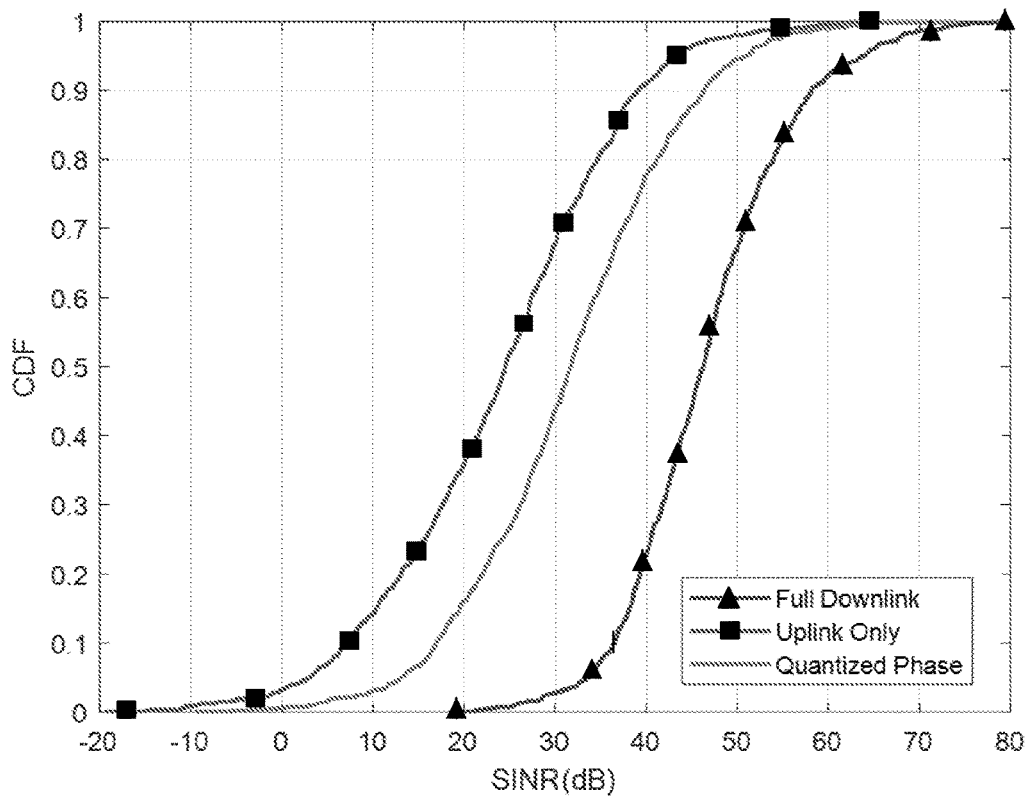
FIG. 11A shows a diagram for depicting curves of SINR versus CDF, where the data are measured in the downlink path of the millimeter wave base station antenna system that is operated under N=2.
Figure 11B:
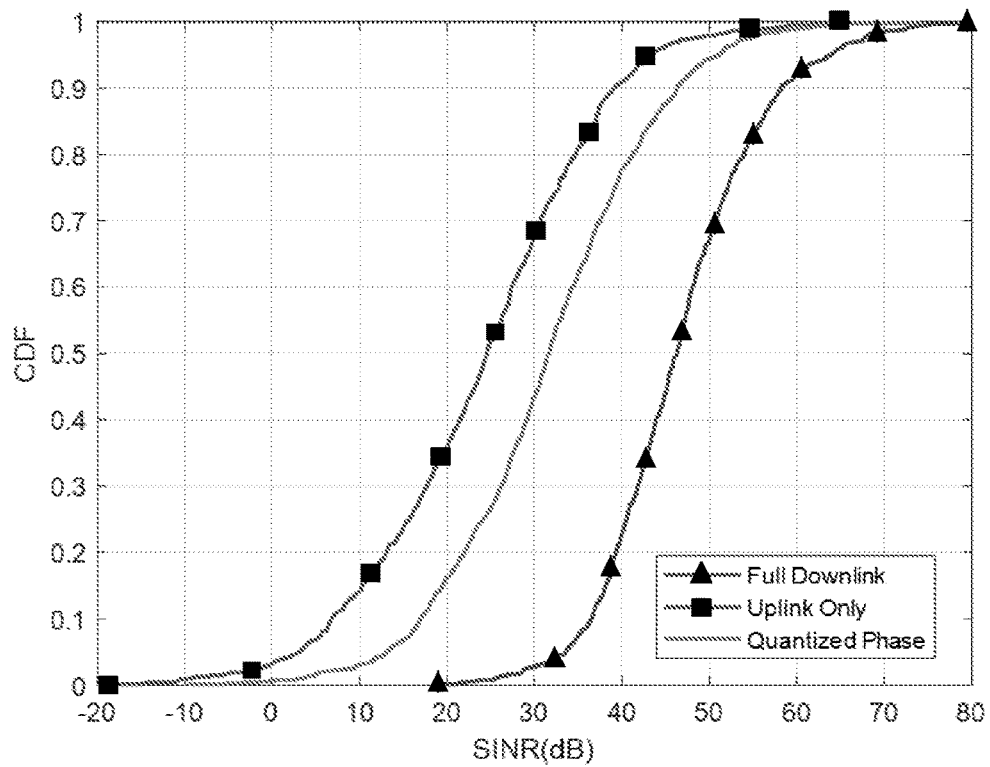
FIG. 11B shows a diagram for depicting curves of SINR versus CDF, where the data are measured in the downlink path of the millimeter wave base station antenna system that is operated under N=4.
Figure 11C:
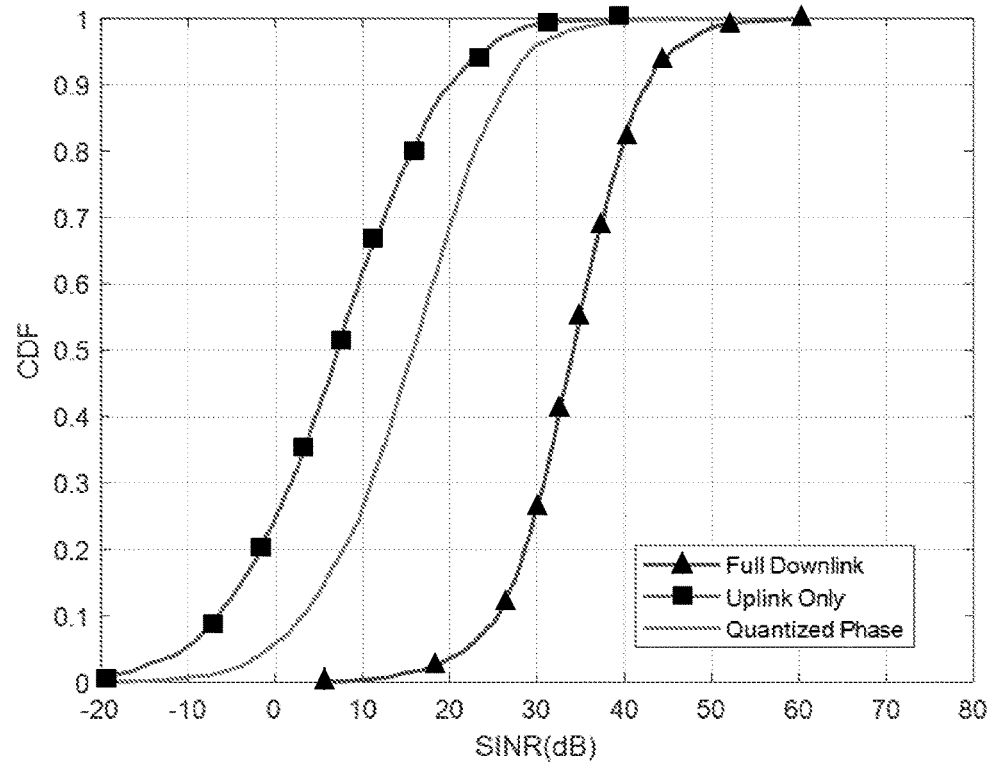
FIG. 11C shows a diagram for depicting curves of SINR versus CDF, where the data are measured in the downlink path of the millimeter wave base station antenna system that is operated under N=6.
Figure 11D:
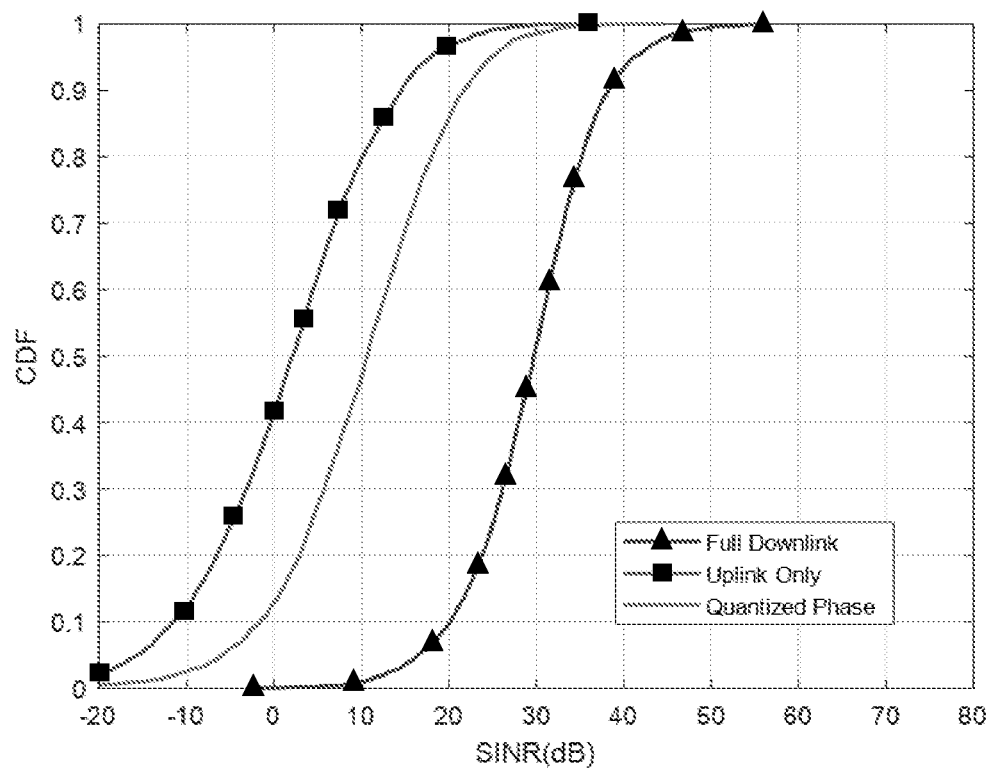
FIG. 11D shows a diagram for depicting curves of SINR versus CDF, where the data are measured in the downlink path of the millimeter wave base station antenna system that is operated under N=8.

First, assume $L_{n0}$ is randomly distributed in (0~10 dB). We randomly generate 1000 sets of N user's channel responses, and find the corresponding $(SINR)_n$, the CDF of $(SINR)_n$ for N=2, 4, 6, 8 are shown in FIG. 10. It is seen the SINR performance degrades as the number of users increases.

For the FDD downlink transmission, we use the downlink carrier frequency to calculate the downlink frequency responses. We use three different methods to construct the downlink weighting functions, the exact downlink channel responses, the approximation method as described in the single user case and the uplink channel response. The resultant CDF plots of SINR for different N are shown in FIG. 11. It is seen that the approximation method is no longer valid for the multiuser cases and the uplink channel response method has the worst performance. The performances are degraded about 20 dB compared to the exact method. The channel estimation error in signal amplitude will enhance the multiple access interference.

Experimental Examples

In the following we use a synthetic aperture antenna to simulate the multiport basestation antenna. The subantenna is a horn antenna. It is mounted on an arm with a length of 40 cm and driven by a stepping motor. We rotate the horn and record the received field with a fixed angular increment. This arrangement is equivalent to a real aperture antenna with subapertures uniformly distributed on the curved surface of a constant radius. Each subaperture is a broadside horn antenna. Output of the horn is connected to a network analyzer. The received signal is down converted, digitized and stored for each rotation angle and frequency point. The digitized signals from each rotation angle are then processed in the baseband.

Figure 12:
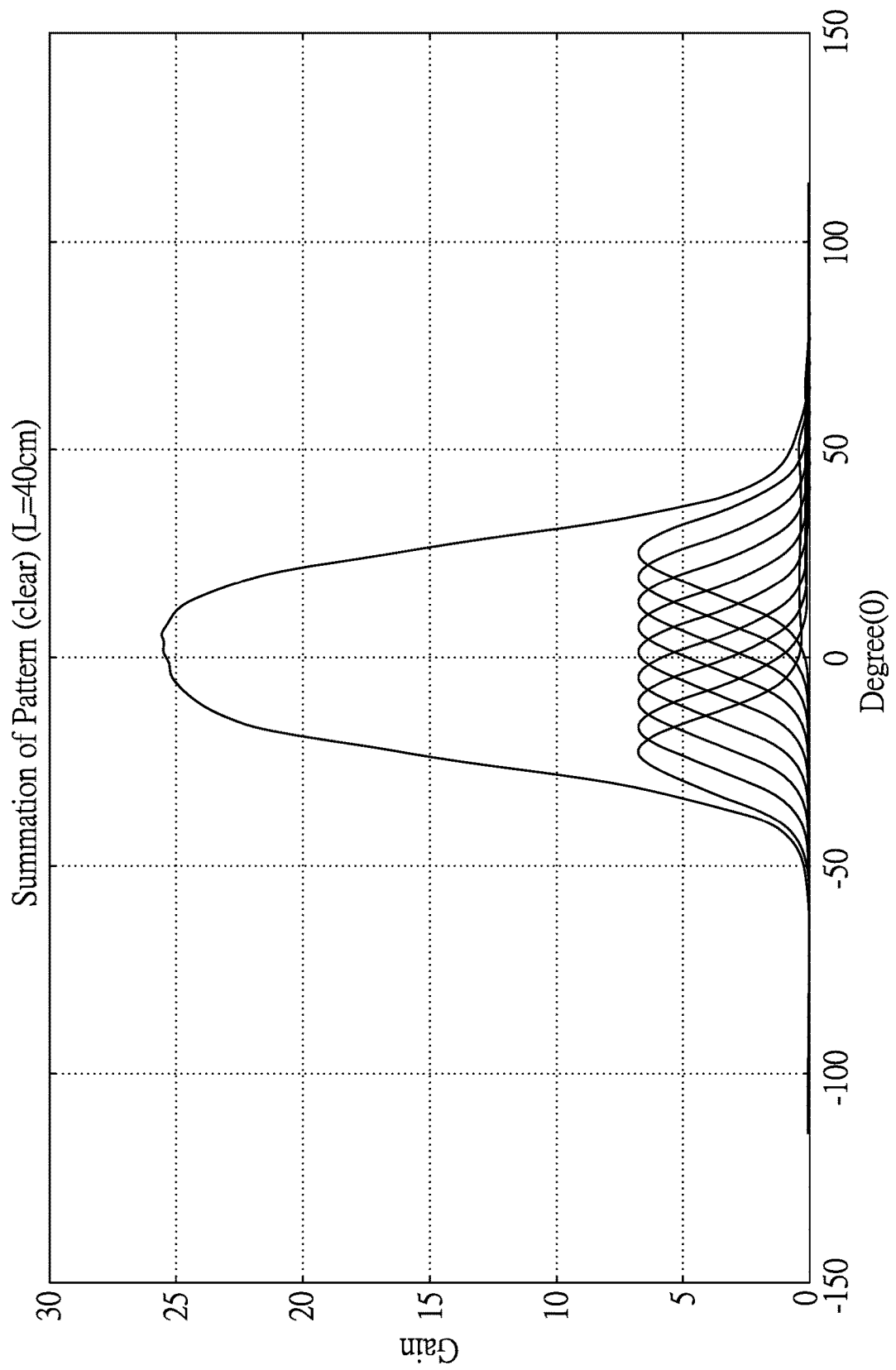
FIG. 12 shows a diagram for depicting radiation patterns of a horn antenna at different steering angles and the effective gain pattern after MRC.

The radiation patterns of the horn antenna at 38 GHz for different steering angles are shown in FIG. 12. After MRC the resultant effective gain pattern is also shown in the same figure.

Figure 13:
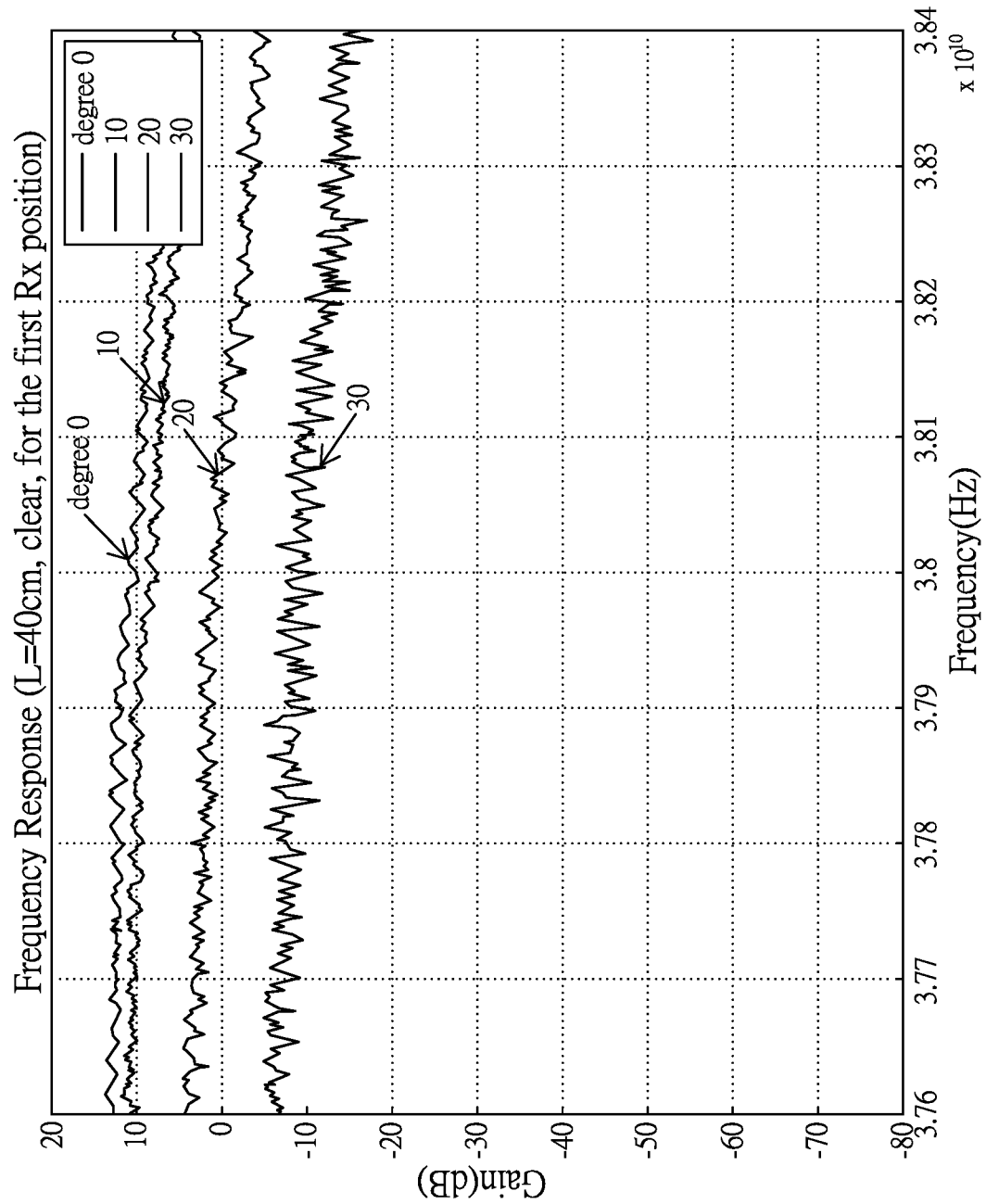
FIG. 13 shows a diagram for depicting channel responses measured at different steering angles and the resultant responses after MRC in case of the direct path being clear.

In an indoor environment, the transmitting antenna is a low-gain waveguide aperture antenna. Shown in FIG. 13 are the channel responses measured at different rotation angles and the resultant responses after MRC when the transmitting antenna is located at a distance of 5 m to the basestation antenna. It is seen after MRC the responses are much enhanced.

Summary

Thanks to the designs disclosed above, the present invention offers the advantages as follows:

By providing an uplink baseband processing unit and a downlink baseband processing unit in the baseband signal processor, the uplink baseband processing unit is adopted for generating a first weighting function, and the downlink baseband processing unit is utilized for generating a second weighting function. Therefore, the first weighting function and the second weighting function are executed to enhance the desired signal and eliminate the multiuser interference.

As can be seen from the disclosure above, the present invention can be summarized as follows:

1. In this invention, we propose a new millimeter wave basestation antenna structure consisting of multiport subantennas and a baseband signal processor. Each subantenna is steered to different direction but the adjacent antennas have highly overlapped antenna patterns. The subantennas have a half-power beamwidth $\Delta\alpha_{3\ dB}$. The steering direction of the $m^{th}$ subantenna is denoted by $\alpha_m$. The angular difference of the steering angles between the adjacent subantennas is given by $$\Delta\alpha = \alpha_m - \alpha_{m-1}$$

$$\Delta\alpha = \frac{1}{x}\Delta\alpha_{3dB}$$

Let

If $x \geq 1.5$, the antenna is called highly overlapped, otherwise it is called loosely overlapped. The greater the x is, the more the overlap will be. After the maximum ratio combining (MRC), the effective gain of the whole antenna is about x times of the gain of a single subantenna. The more the overlap, the higher the effective gain, however the larger the total size of the whole antenna will be.

Parameters of the basestation antenna design include the number of the subantennas, the number of antenna elements of each subarray, or the type of each subaperture, the steering direction of each subantenna. How to design the subantennas depends on the channel environments.

For example, an open areas or indoors, suburban or city, a narrow valley or boulevard, in a hall or exhibition place, etc. The antenna company can select several different typical environments and predesign suitable subantennas for customers (basestation operators) to select the best one. In this structure no adjustable phase shifters are required. Users at any direction can be covered by the mainbeams of several subantennas. After the baseband MRC processing, the effective gain of the basestation antenna can be as large as x times of the gain of a single subantenna. There are several advantages for this simple structure. It is easy to build the antenna hardware, because technologies of building broadside subantennas are very mature. Free of analog phase shifters and DC control circuits make the manufacturing cost much cheaper than the other types of basestation antennas. Each port only needs a broadside subantenna, a T/R module chip (include a LNA, a PA, a mixer, a T/R switch) for the RF section. It is important to note that implementation cost will be a key issue for future 5G mm-wave systems, because the base station density will be very high due to the small coverage of each base station, especially in indoor environments. With our proposed method, it needs not to search or track the user's direction. This can save the overhead to search a new user and can reduce the latency to build a new connection. Our beamforming method is fully digitally processed. It can be controlled on each subcarriers basis. Multiusers from different directions can share the whole bandwidth at the same time (i.e., the OFDMA). This can make the scheduling process more flexible and more efficient. When the direct path is seriously obstructed and highly attenuated multipath components become the dominant sources of signal transmission. Multipaths from different directions and different time delays will interfere each other and results in deep fading both in the spatial and spectral domains. We have found that single-port beamforming cannot improve the deep fading phenomena, while multiport MRC processing can effectively suppress the deep fading and keep the transmission much stable. Therefore, the multiport MRC processing is an effective way to overcome the deep fading.

2. In this invention, we derive a formula for an uplink MIMO system which is the average $(SINR)_n$ of the $n^{th}$ user as a function of the weighting matrix, the number of users N, and the variance of the thermal noise $\sigma^2$, given by $$(SINR)_n = \frac{1}{(N+1)\sum_{m=1}^{M}|W_{nm}|^2\sigma^2}$$

where $W_{min}$ is the (n, m)$^{th}$ element of the W matrix. The weighting matrix W given by $$W=(\tilde{H}^H\tilde{H})^{-1}\tilde{H}^H$$

where $\tilde{H}$ is the estimated channel response matrix measured by the subantennas through the pilot channels. In this formula, we assume the channel estimation error is only due to the thermal noise.

From this formula, we can predict the average SINR of each $n^{th}$ user (mobile device). If the value is below a threshold which means the transmission performance of the $n^{th}$ user not acceptable. The basestation can ask the corresponding user to withdraw from the sharing group.

3. For the downlink TDD system, uplink and downlink use the name carrier frequency and have the same channel responses. It needs not to estimate the downlink channel responses because they have been estimated during the uplink signal processing period. In this invention, we propose methods for the downlink pilot design and the SINR evaluation for every user. The procedure is as follows a. We transmit pilot signal vectors $\bar{x}_{1p}^T=(x_{1p}, 0, \ldots, 0)$, $\bar{x}_{2p}^T=(0, x_{2p}, \ldots, 0), \bar{x}_{Np}^T=(0, 0, \ldots, x_{Np})$, sequentially to the N users. The pilot symbols $x_{np}$, for all n are known to all users (mobile devices).

b. When the pilot vector $\bar{x}_{np}$ is transmitted, the signal vector received by the users is denoted by $\bar{z}_{np}$, $$\bar{z}_{np}^T=(z_{n1p},z_{n2p}, \ldots ,z_{nNp})$$

$$\bar{z}_{np}=H^T\cdot W'\bar{x}_{np}+\bar{n}_{np}$$

where H is the channel response matrix, W' is the downlink weighting matrix constructed by the uplink estimated channel response matrix $\tilde{H}$, is given by $$W'=\tilde{H}^*(\tilde{H}^T\cdot\tilde{H}^*)^{-1}$$

$z_{nn'p}$ is the signal received by the $n'^{th}$ user when the basestation intends to transmit a pilot signal $\bar{x}_{np}$ to the $n^{th}$ user. It is noted that $|z_{nnp}|^2$ is the desired signal power of the $n^{th}$ user when the $n^{th}$ pilot $\bar{z}_{np}$ is transmitted. $|z_{nn'p}|^2$ is the signal power received by the $n'^{th}$ user when $\bar{z}_{np}$ is transmitted, which is the interference to the $n'^{th}$ user from the $n^{th}$ user. After all pilot signals $|z_{nnp}|^2$ are transmitted, each user can measure his desired signal power $|z_{nnp}|^2$ and his total interference power $\Sigma_{n'\neq n}|z_{n'np}|^2$. The average $(SINR)_n$ of the $n^{th}$ user is given by $$(SINR)_n = \frac{|Z_{nnp}|^2}{\sum_{n'\neq n}|Z_{n'np}|^2+\sigma^2}$$

If any user found that his average SINR below a threshold, which means his data transmission performance is not acceptable, he can ask the basestation to withdraw from the sharing group.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A millimeter wave base station antenna structure system, comprising:
   multiport subantennas; and
   a baseband signal processor;
   each of the multiport subantennas being steered to a different direction and each two adjacent antennas of the multiport subantennas having overlapped antenna patterns, characterized in that:
   each of the multiport subantennas has a half-power beamwidth $\Delta\alpha_{3\ dB}$; and
   a $m^{th}$ subantenna of the multiport subantennas has a steering direction denoted by $\alpha_m$, m being a positive integer greater than 1, and each two adjacent antennas of the multiport subantennas have an angular difference $\Delta\alpha=\alpha_m-\alpha_{m-1}$, and the angular difference $\Delta\alpha$ is confined by $\Delta\alpha=1/x\Delta\alpha_{3\ dB}$, $x\geq 1.5$, so that the multiport subantennas will have an effective gain about x times of a gain of a single subantenna of the multiport subantennas after performing a maximum ratio combining (MRC) process on signals received by the multiport subantennas.

2. The millimeter wave base station antenna system of claim 1, wherein the millimeter wave base station antenna system supports an uplink multiple input multiple output (MIMO) wireless communication with a sharing group of N mobile devices, N is a positive integer greater than 1; in case of a channel estimation error is only due to a thermal noise, a $n^{th}$ mobile device of the N mobile devices has a signal-to-interference-and-noise ratio $(SINR)_n$ given by $$(SINR)_n = \frac{1}{(N+1)\sum_{m=1}^{M}|W_{nm}|^2\sigma^2}$$

where $W_{nm}$ is a (n, m)$^{th}$ element of a weighting matrix W, $\sigma^2$ is a variance of the thermal noise, and the weighting matrix W is given by $$W=(\tilde{H}^H\tilde{H})^{-1}\tilde{H}^H$$

where $\tilde{H}$ is an estimated channel response matrix measured by the multiport subantennas through pilot signals; and the millimeter wave base station antenna system can ask the $n^{th}$ mobile device to withdraw from the sharing group if the SINR is below a threshold.

3. The millimeter wave base station antenna system of claim 1, wherein the millimeter wave base station antenna system supports a downlink time division duplex (TDD) wireless communication with a sharing group of N mobile devices, N is a positive integer greater than 1, the downlink TDD wireless communication includes procedures as follows:

transmit pilot signal vectors $\bar{x}_{1p}^T=(x_{1p}, 0, \ldots, 0)$, $\bar{x}_{2p}^T=(0, x_{2p}, \ldots, 0)$, $\bar{x}_{Np}^T=(0, 0, \ldots, x_{Np})$, sequentially to the N mobile devices, pilot symbols $x_{np}$, for all n being known to all the N mobile devices;

after the pilot signal vector $\bar{x}_{np}$ is transmitted, signal vector received by the N mobile devices is denoted by $\bar{z}_{np}$, $$\bar{z}_{np}^T=(z_{n1p}, z_{n2p}, \ldots, z_{nNp})$$

$$\bar{z}_{np}=H^T \cdot W'\bar{x}_{np}+\bar{n}_{np}$$

where H is a channel response matrix, W' is a downlink weighting matrix given by $$W'=\tilde{H}^*(\tilde{H}^T \cdot \tilde{H}^*)^{-1}, \text{ and}$$

$z_{nn'p}$ is a signal received by a $n'^{th}$ mobile device when $\bar{x}_{np}$ is transmitted, and is an interference to a $n'^{th}$ mobile device due to the $n^{th}$ mobile device;

each mobile device of the N mobile devices measures a desired signal power $|z_{nnp}|^2$ and a total interference power $\Sigma_{n' \neq n}|z_{n'np}|^2$, and derives an $(SINR)_n$ value given by $$(SINR)_n = \frac{|Z_{nnp}|^2}{\sum_{n' \neq n} |Z_{n'np}|^2 + \sigma^2},$$

where $\sigma^2$ is a variance of a thermal noise, $|z_{n'np}|^2$ is an interference power to the $n^{th}$ mobile device due to the $n'^{th}$ mobile device; and each of the N mobile devices can withdraw from the sharing group if the $(SINR)_n$ value is below a threshold.

4. A millimeter wave base station antenna system, comprising:

an antenna array, including a plurality of antenna elements divided into M subarrays, each of the M subarrays having a port, and M being a positive integer greater than 1;

a front-end analog processing circuit, including M transmitter/receiver units coupled respectively to the ports of the M subarrays, M analog baseband processing units coupled respectively to the M transmitter/receiver units, and M analog-to-digital and digital-to-analog conversion units coupled respectively to the M analog baseband processing units; and a baseband processing circuit, including M serial-to-parallel and parallel-to-serial conversion units coupled respectively to the M analog-to-digital and digital-to-analog conversion units and a baseband processor coupled to the M serial-to-parallel and parallel-to-serial conversion units;

wherein after a first RF signal is transmitted by a wireless electronic device and then received by the antenna array, the first RF signal is converted to a first digital in-phase signal and a first digital quadrature signal by the front-end analog processing circuit, and Q first subcarriers are generated according to the first digital in-phase signal and the first digital quadrature signal by at least one of the M serial-to-parallel and parallel-to-serial conversion units of the baseband processing circuit, Q being a positive integer greater than 1; and wherein the baseband processor receives the Q first subcarriers in parallel, has an uplink baseband processing unit for generating a first weighting function according to the Q first subcarriers, and has a downlink baseband processing unit for generating a second weighting function according to Q second subcarriers; and wherein the antenna elements are aperture antennas, and each two beam patterns of two neighboring said aperture antennas highly overlap each other.

5. The millimeter wave base station antenna system of claim 4, wherein each of the M subarrays is driven to radiate a steered beam of millimeter wave with a beam pattern and a beam direction, and the M subarrays being disposed on a surface selected from a group consisting of planar surface and curved surface with a specific radius.

6. The millimeter wave base station antenna system of claim 4, wherein each of the M transmitter/receiver units comprises:

a switch having a first terminal, a second terminal and a third terminal, the first terminal being coupled to the antenna elements in a respective subarray;

a low noise amplifier coupled to the second terminal of the switch;

a frequency down-converter coupled between the low noise amplifier and a respective analog baseband processing unit and receiving an in-phase signal and a quadrature signal that are generated by a local oscillator;

a power amplifier coupled to the third terminal of the switch; and a frequency up-converter coupled between the power amplifier and the respective analog baseband processing unit and receiving the in-phase signal and the quadrature signal.

7. The millimeter wave base station antenna system of claim 6, wherein the each of the M analog baseband processing units comprises:

a transimpedance amplifier coupled to the frequency down-converter of a respective transmitter/receiver unit;

a first low-pass filter coupled to the transimpedance amplifier;

a first variable gain amplifier coupled between the first low-pass filter and a respective analog-to-digital and digital-to-analog conversion unit;

a first buffer coupled to the respective analog-to-digital and digital-to-analog conversion unit;

a second low-pass filter coupled to the first buffer; and a second variable gain amplifier coupled between the second low-pass filter and the frequency up-converter of the respective transmitter/receiver unit.

8. The millimeter wave base station antenna system of claim 7, wherein each of the M analog-to-digital and digital-to-analog conversion units comprises:

a second buffer coupled to the first variable gain amplifier of the analog baseband processing unit;

an analog-to-digital converter coupled between the second buffer and a respective serial-to-parallel and parallel-to-serial conversion unit of the baseband processing circuit; and a digital-to-analog converter coupled between the respective serial-to-parallel and parallel-to-serial conversion unit and the first buffer of the analog baseband processing unit.

9. The millimeter wave base station antenna system of claim 8, wherein when the switch is switched to make the first terminal electrically connected to the second terminal, the low noise amplifier, the frequency down-converter, the transimpedance amplifier, the first low-pass filter, the first variable gain amplifier, the second buffer, and the analog-to-digital converter are utilized in a downlink path to process the first RF signal received by the respective subarray with a signal amplifying operation, a frequency down conversion, a current-to-voltage conversion, a noise filtering operation, a gain modulating operation, and an analog-to-digital conversion respectively, thereby generating the first digital in-phase signal and the first digital quadrature signal.

10. The millimeter wave base station antenna system of claim 9, wherein when the switch is switched to make the first terminal electrically connected to the third terminal, the digital-to-analog converter, the first buffer, the second low-pass filter, the second variable gain amplifier, the frequency up-converter, and the power amplifier are utilized in the downlink path to process a second digital in-phase signal and a second digital quadrature signal transmitted from the respective serial-to-parallel and parallel-to-serial conversion unit with a digital-to-analog conversion, a noise filtering operation, a gain modulating operation, a frequency up conversion, and a power amplifying operation respectively, thereby radiating a second RF signal through one of said antenna elements in the respective subarray.

11. The millimeter wave base station antenna system of claim 10, wherein each of the M serial-to-parallel and parallel-to-serial conversion units comprises:

a cyclic prefix removing unit coupled to the analog-to-digital converter of the respective analog-to-digital and digital-to-analog conversion unit for performing a cyclic prefix removing operation on the first digital in-phase signal and the first digital quadrature signal to generate a prefix removed in-phase signal and a prefix removed quadrature signal;

a serial-to-parallel converter coupled to the cyclic prefix removing unit for performing a serial-to-parallel conversion on the prefix removed in-phase signal and the prefix removed quadrature signal to generate Q input signals;

a fast Fourier transform unit coupled to the serial-to-parallel converter for performing a fast Fourier transform operation on the Q input signals to generate the Q first subcarriers;

an inverse fast Fourier transform unit coupled to the baseband processor for receiving the Q second subcarriers and performing an inverse fast Fourier transform operation on the Q second subcarriers to generate Q output signals;

a parallel-to-serial converter coupled to the inverse fast Fourier transform unit for performing a parallel-to-serial conversion on the Q output signals to generate the second digital in-phase signal and the second digital quadrature signal; and a cyclic prefix inserting unit coupled to the parallel-to-serial converter for performing a cyclic prefix inserting operation on the second digital in-phase signal and the digital quadrature signal to generate a cyclic prefix inserted in-phase signal and a cyclic prefix inserted quadrature signal and transmitting the cyclic prefix inserted in-phase signal and the second cyclic prefix inserted quadrature signal to the digital-to-analog converter of the respective analog-to-digital and digital-to-analog conversion unit.

\* \* \* \* \*